United States Patent
Clarkson et al.

(10) Patent No.: US 9,317,134 B2
(45) Date of Patent: *Apr. 19, 2016

(54) PROXIMITY OBJECT TRACKER

(71) Applicant: QUALCOMM Incorporated, San Diego, CA (US)

(72) Inventors: Ian Clarkson, Ottawa (CA); Evan Hildreth, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 581 days.

This patent is subject to a terminal disclaimer.

(21) Appl. No.: 13/972,064

(22) Filed: Aug. 21, 2013

(65) Prior Publication Data

US 2015/0363009 A1  Dec. 17, 2015

Related U.S. Application Data

(63) Continuation of application No. 12/578,530, filed on Oct. 13, 2009, now Pat. No. 8,547,327.

(60) Provisional application No. 61/249,527, filed on Oct. 7, 2009.

(51) Int. Cl.
   G09G 5/00    (2006.01)
   G06F 3/03    (2006.01)
   G06F 3/01    (2006.01)
   G06F 3/042   (2006.01)
   G06K 9/00    (2006.01)
   G06T 7/00    (2006.01)
   H04N 5/225   (2006.01)

(52) U.S. Cl.
   CPC .............. *G06F 3/0304* (2013.01); *G06F 3/017* (2013.01); *G06F 3/0421* (2013.01); *G06F 3/0428* (2013.01); *G06K 9/00335* (2013.01); *G06T 7/004* (2013.01); *H04N 5/2256* (2013.01); *E05Y 2800/106* (2013.01)

(58) Field of Classification Search
   None
   See application file for complete search history.

(56) References Cited

U.S. PATENT DOCUMENTS

| | | |
|---|---|---|
| 5,982,352 A | 11/1999 | Pryor |
| 6,157,368 A | 12/2000 | Fager |
| 6,393,136 B1 | 5/2002 | Amir et al. |
| 6,624,833 B1 * | 9/2003 | Kumar ............... G06F 3/017 345/156 |
| 6,707,444 B1 | 3/2004 | Hendriks et al. |
| 6,961,443 B2 | 11/2005 | Mahbub |
| 7,098,956 B2 | 8/2006 | Keitel et al. |
| 7,259,747 B2 | 8/2007 | Bell |
| 7,292,711 B2 | 11/2007 | Kiraly et al. |
| 7,526,131 B2 | 4/2009 | Weber |
| 7,542,072 B2 | 6/2009 | DeMenthon |
| 7,650,015 B2 | 1/2010 | Pirim |
| 7,692,625 B2 | 4/2010 | Morrison et al. |
| 8,068,641 B1 | 11/2011 | Hildreth |
| 8,144,123 B2 | 3/2012 | Denoue et al. |
| 8,515,128 B1 * | 8/2013 | Hildreth ............ G06F 3/017 345/156 |
| 8,547,327 B2 * | 10/2013 | Clarkson ............ G06F 3/017 345/156 |
| 8,897,496 B2 * | 11/2014 | Hildreth ............ G06F 3/017 345/156 |

(Continued)

*Primary Examiner* — Peter Vincent Agustin
(74) *Attorney, Agent, or Firm* — Kilpatrick Townsend Stockton LLP

(57) ABSTRACT

Object tracking technology, in which controlling an illumination source is controlled to illuminate while a camera is capturing an image to define an intersection region within the image captured by the camera. The image captured by the camera is analyzed to detect an object within the intersection region. User input is determined based on the object detected within the intersection region and an application is controlled based on the determined user input.

30 Claims, 20 Drawing Sheets

(56) References Cited

U.S. PATENT DOCUMENTS

| | | |
|---|---|---|
| 2002/0036617 A1 | 3/2002 | Pryor |
| 2002/0097218 A1 | 7/2002 | Gutta et al. |
| 2004/0032398 A1 | 2/2004 | Ariel et al. |
| 2004/0070565 A1 | 4/2004 | Nayar et al. |
| 2005/0122308 A1 | 6/2005 | Bell et al. |
| 2006/0033713 A1 | 2/2006 | Pryor |
| 2007/0091178 A1 | 4/2007 | Cotter et al. |
| 2008/0122786 A1 | 5/2008 | Pryor et al. |
| 2009/0103780 A1 | 4/2009 | Nishihara et al. |
| 2009/0122146 A1 | 5/2009 | Zalewski et al. |
| 2009/0303176 A1 | 12/2009 | Chen et al. |
| 2010/0277412 A1 | 11/2010 | Pryor |
| 2011/0080490 A1 | 4/2011 | Clarkson et al. |
| 2011/0134237 A1 | 6/2011 | Belt |
| 2014/0028628 A1 | 1/2014 | Hildreth |

\* cited by examiner

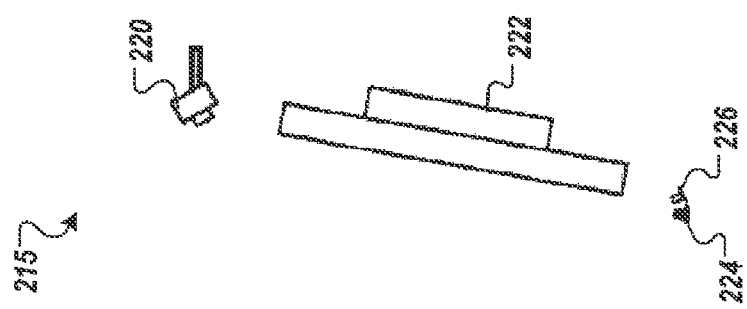
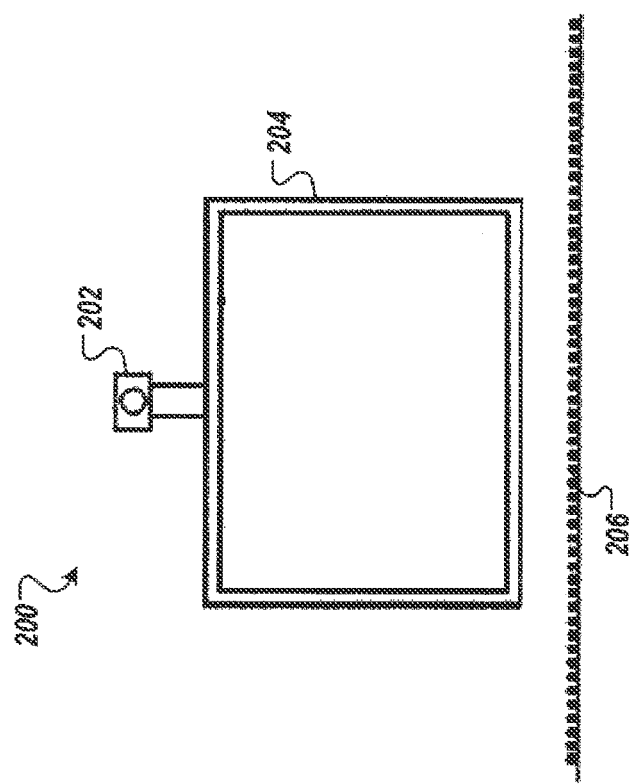

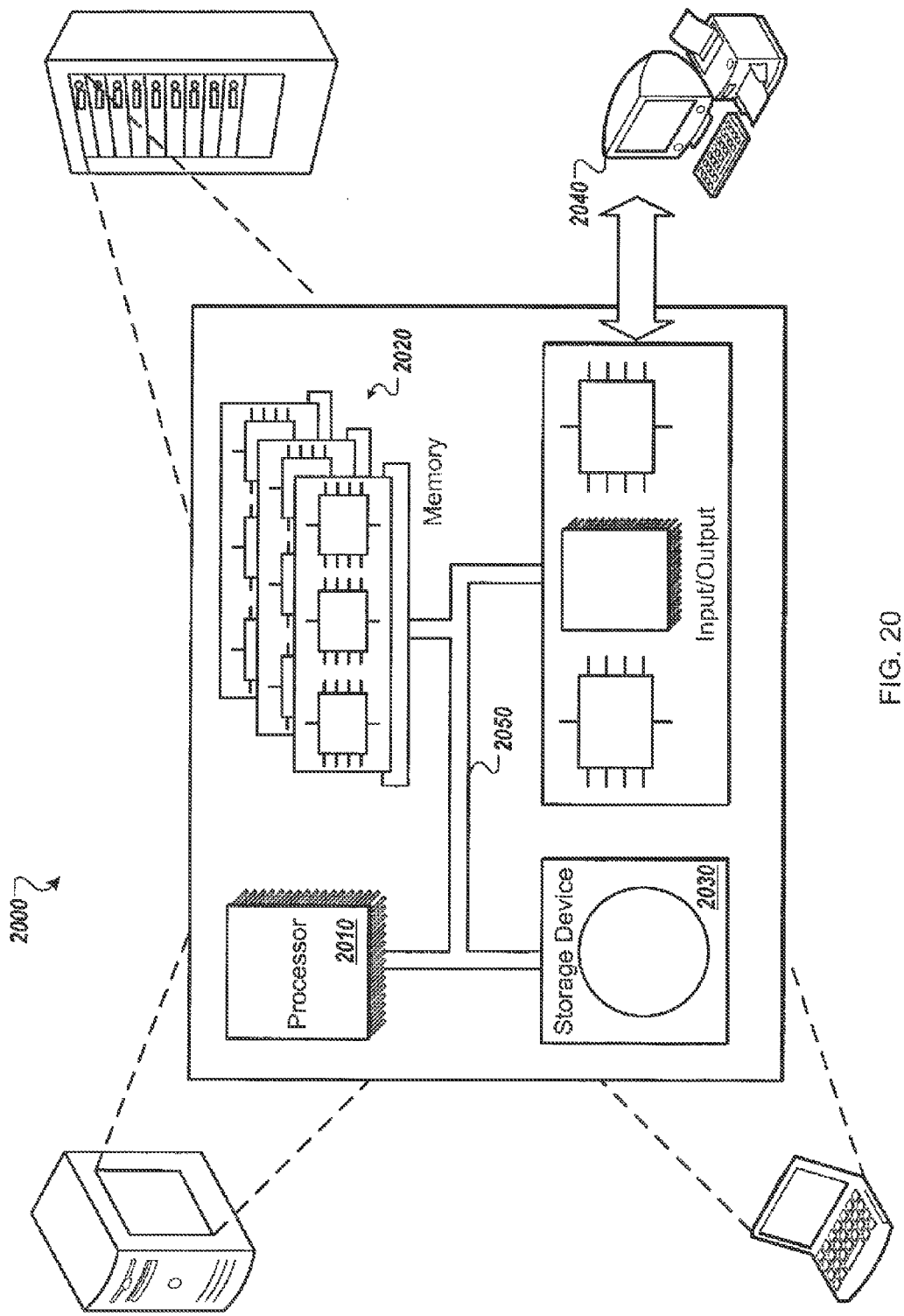

PROXIMITY OBJECT TRACKER

CROSS-REFERENCE TO RELATED APPLICATIONS

This application is a continuation of U.S. patent application Ser. No. 12/578,530, filed Oct. 13, 2009 and entitled "Proximity Object Tracker", which claims priority from U.S. Provisional Patent Application Ser. No. 61/249,527, filed Oct. 7, 2009, entitled "Hover Detection." The entire contents of the previous applications are incorporated herein by reference for all purposes.

FIELD

The present disclosure generally relates to object tracking.

BACKGROUND

Cameras have been used to capture images of objects. Techniques have been developed to analyze one or more images of an object present within one or more images to detect a position of the object. For example, optical flow has been used to detect motion of an object by analyzing multiple images of the object taken successively in time.

SUMMARY

In one aspect, an electronic system includes a camera having a field of view of a first area and an illumination source that is angled with respect to the camera and that is configured to illuminate a second area. The second area intersects the first area to define an intersection region within the field of view of the camera. The electronic system also includes a processing unit configured to perform operations. The operations includes capturing an image from the camera and analyzing the image captured by the camera to detect an object within the intersection region. The operations also include determining user input based on the object detected within the intersection region and controlling an application based on the determined user input.

Implementations may include one or more of the following features. For example, the electronic system may include a display screen configured to display a graphical user interface. In this example, the camera may be positioned at a first side of the display screen, may be angled with respect to the display screen, and the field of view of the camera may be of the first area in front of the display screen. Further, in this example, the illumination source may be positioned at a second side of the display screen, may be angled with respect to the display screen, and may be configured to illuminate the second area in front of the display screen. The second side of the display screen may be opposite of the first side of the display screen and the second area in front of the display screen may intersect the first area in front of the display screen to define the intersection region in front of the display screen.

In some examples, the operations performed by the processing unit may include comparing pixels of the image captured by the camera to a brightness threshold to produce a binary image. Pixels in the binary image may indicate whether or not the corresponding pixels in the image captured by the camera meet the brightness threshold. In these examples, the operations also may include grouping pixels within the binary image into one or more blobs, grouping the one or more blobs into one or more clusters, and determining a position of one or more objects in the binary image based on the one or more clusters.

In some implementations, the operations may include clustering blobs within the binary image into one or more clusters based on a tracking mode of the electronic system. For instance, when the electronic system is configured in a single object tracking mode, the operations may include clustering blobs within the binary image into a single cluster, determining a position of the single object based on the single cluster; and determining user input based on the position of the single object.

When the electronic system is configured in a two object adjacent tracking mode, the operations may include clustering blobs in a horizontal direction from an outer edge of first and second sides of the binary image to a center of the binary image to identify a first cluster at the first side of the image and a second cluster at the second side of the image. The operations also may include determining a position of a first object based on the first cluster, determining a position of a second object based on the second cluster, and determining user input based on the position of the first object and the position of the second object. The operations further may include weighting proximity of blobs in the horizontal direction higher than proximity of blobs in a vertical direction in clustering blobs together.

When the electronic system is configured in a two object stacked tracking mode, the operations may include clustering blobs in a vertical direction from an outer edge of a top and a bottom of the binary image to a center of the binary image to identify a first blob at a top portion of the image and a second blob at a bottom portion of the image. The operations also may include determining a position of a first object based on the first cluster, determining a position of a second object based on the second cluster, and determining user input based on the position of the first object and the position of the second object. The operations further may include weighting proximity of blobs in the vertical direction higher than proximity of blobs in a horizontal direction in clustering blobs together.

In some examples, the operations may include determining a tracking mode of the electronic system from among at least a single hand tracking mode, a two hand adjacent tracking mode, and a two hand stacked tracking mode. In response to the determined tracking mode of the electronic system being the single hand tracking mode, the operations may include clustering blobs within the binary image into a single cluster and computing a position of the single object based on the single cluster. In response to the determined tracking mode of the electronic system being the two hand adjacent tracking mode, the operations may include clustering blobs in a horizontal direction from an outer edge of first and second sides of the binary image to a center of the binary image to identify a first cluster at the first side of the image and a second cluster at the second side of the image, computing a position of a first object based on the first cluster, and computing a position of a second object based on the second cluster. In response to the determined tracking mode of the electronic system being the two hand stacked tracking mode, the operations may include clustering blobs in a vertical direction from an outer edge of a top and a bottom of the binary image to a center of the binary image to identify a first cluster at a top portion of the image and a second cluster at a bottom portion of the image, computing a position of a first object based on the first cluster, and computing a position of a second object based on the second cluster.

In some implementations, the operations may include mapping a position of the detected object to an interface displayed by the application being controlled and determining user input based on the mapped position of the detected object to the interface displayed by the application being controlled. In these implementations, the operations may include determining whether the mapped position of the detected object corresponds to an element displayed in the interface displayed by the application being controlled. In addition, in these implementations, the operations may include mapping the position of the detected object to a cursor position in the interface displayed by the application being controlled and determining user input based on the cursor position in the interface displayed by the application being controlled.

In some examples, the operations may include detecting performance of a gesture by the detected object based on positions of the detected object determined within a series of images captured by the camera and determining user input based on the detected gesture. In these examples, the operations may include detecting a swipe gesture and determining user input based on the detected swipe gesture. Further, in these examples, the operations may include detecting a gesture in which two detected objects are moving horizontally together or apart and determining user input based on the detected gesture in which two detected objects are moving horizontally together or apart.

The illumination source may be a first illumination source and the electronic system may include a second illumination source that is angled with respect to the camera differently than the first illumination source and that is configured to illuminate a third area. The third area may intersect the first area, may be different than the second area, and, in combination with the second area, may define a combined intersection region within the field of view of the camera. When the electronic system includes a second illumination source, the operations may include controlling the first and second illumination sources to illuminate in sequence with images captured by the camera in an alternating pattern, identifying a first image captured when the first illumination source was illuminated and the second illumination sources was not illuminated, identifying a second image captured when the first illumination source was not illuminated and the second illumination sources was illuminated, and analyzing the first and second images in combination to determine a position of an object within the combined intersection region defined by the first and second illumination sources.

In some implementations, the operations may include capturing a grayscale image and comparing pixels of the grayscale image to a brightness threshold to produce a binary image. Pixels in the binary image may indicate whether or not the corresponding pixels in the grayscale image captured by the camera meet the brightness threshold. In these implementations, the operations also may include grouping pixels within the binary image into blobs, referencing the grayscale image in clustering blobs within the binary image into one or more clusters, and determining a position of one or more objects in the binary image based on results of the clustering.

The illumination source may be an infrared emitter. The operations may include ignoring objects that are within the camera's field of view and outside of the intersection region. The operations also may include using motion information to detect a moving object within the intersection region. The motion information may include motion history data and/or optical flow data.

In some examples, the operations may include controlling the illumination source to illuminate while the camera is capturing the image to define the intersection region within the image captured by the camera. In these examples, the operations may include controlling the illumination source to turn on prior to capturing the image from the camera. In addition, in these examples, the operations may include controlling the illumination source to illuminate in sequence with images captured by the camera in an alternating pattern such that a first image captured by the camera is captured when the illumination source is illuminated and a second image captured by the camera is captured when the illumination source is not illuminated. The operations may include subtracting the second image from the first image to produce a resulting image and analyzing the resulting image to detect the object within the intersection region.

In another aspect, at least one computer-readable storage medium is encoded with executable instructions that, when executed by at least one processor, cause the at least one processor to perform operations. The operations include capturing an image from a camera and analyzing the image captured by the camera to detect an object within an intersection region defined within the camera's field of view by an illumination source. The operations also include determining user input based on the object detected within the intersection region and controlling an application based on the determined user input.

In yet another aspect, a method includes capturing an image from a camera and analyzing the image captured by the camera to detect an object within an intersection region defined within the camera's field of view by an illumination source. The method also may include determining user input based on the object detected within the intersection region and controlling an application based on the determined user input.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 1, 2A-B, 3, 15A-C, 16, 18, 19, and 20 are diagrams of exemplary systems.

Like reference numbers represent corresponding parts throughout.

DETAILED DESCRIPTION

Techniques are described for tracking one or more objects (e.g., one or more hands) in front of a display surface. In some implementations, a system includes a light source placed to one of the four sides of a display (e.g., top side of the user-facing surface of the display) with its light oriented towards a tracking region in front of the display. The system also includes a camera placed on the opposite side of the display (e.g., bottom side of the user-facing surface of the display) and oriented towards the tracking region in front of the display. The light source may be a row of infrared emitters (which may or may not be flashing) and the one or more objects (e.g., one or more hands) are tracked within camera images as blobs either individually or as a group.

In these implementations, the placement of the camera and the infrared emitters and their angle relative to each other create an intersection region that defines the tracking region and limits the potential for errors. The tracking region may be moved around or redefined to a certain degree, as long as the infrared emitters do not illuminate other objects beyond the tracked object that are still in the view of the camera. By creating an intersection region and tracking objects within the intersection region, more accurate object tracking may be possible at a lower cost.

Figure 1:
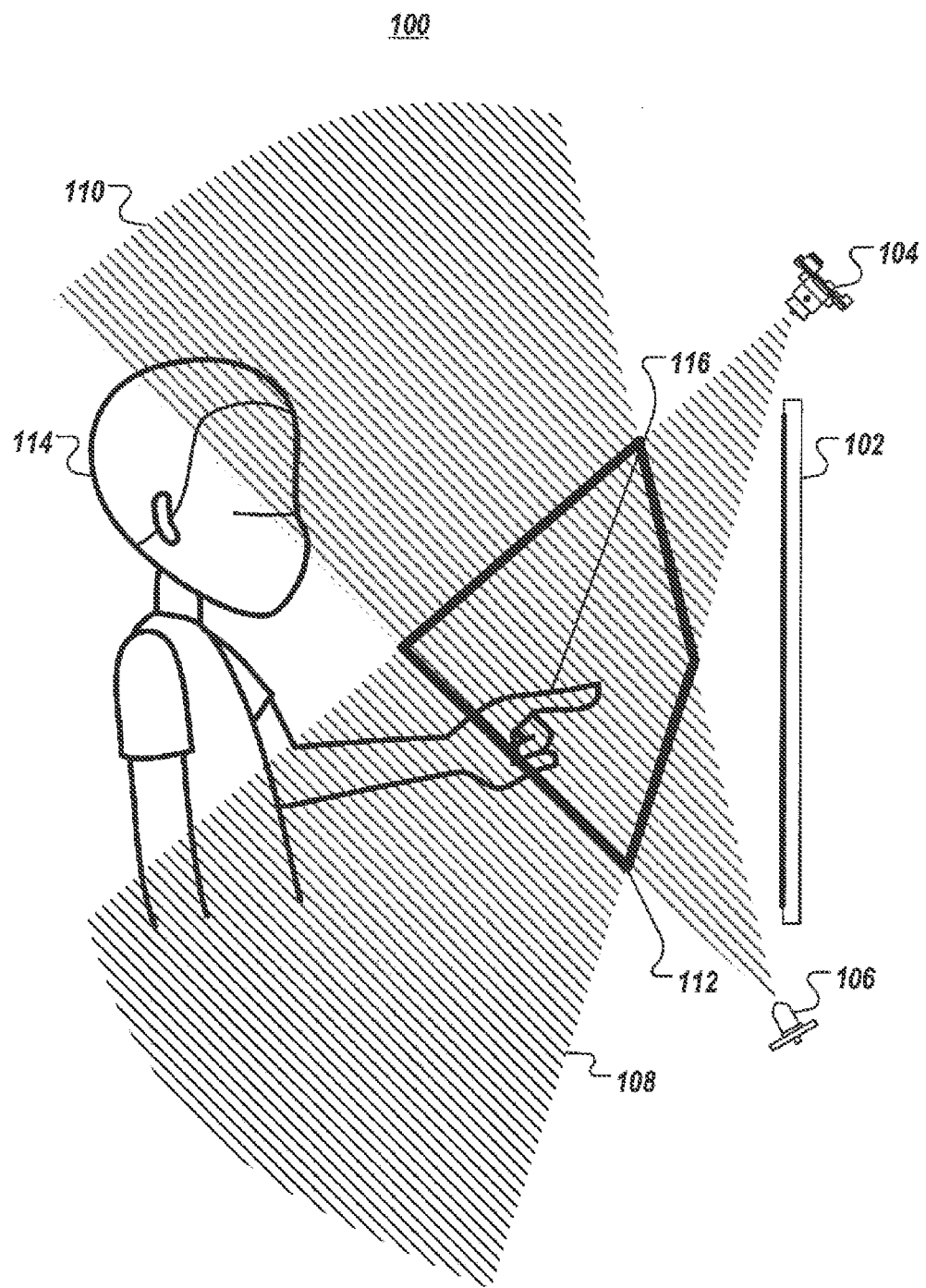

FIG. 1 illustrates an example of a tracking system 100. The system 100 includes a display screen 102, a camera 104, and an illumination source 106. The display screen 102 may be, for example, a computer monitor, digital picture frame, or a television screen, or a non-electric screen upon which an image is projected. In some examples, the display screen 102 may be behind a glass window. The display screen 102 may be configured to display a graphical user interface for an application which includes one or more interface controls.

The camera 104 captures images. The camera 104 is positioned at the top side of the display screen 102 and is angled downward with respect to the display screen 102. A field-of-view 108 of the camera 104 is located in front of the display screen 102. In other configurations, the camera 104 may be positioned at a different side of the display screen 102 (e.g., the bottom, left, or right side) or may be embedded within or included in the display screen 102. The camera 104 also may be positioned behind the display screen 102.

The illumination source 106 is positioned at the bottom edge of the display screen 102 (e.g., at the opposite edge of the display screen 102 as compared to the position of the camera 104) and is angled upward with respect to the display screen 102. In other configurations, the illumination source 106 may be positioned at a different edge of the display screen 102 (e.g., the top edge or a side edge). The illumination source 106 may be, for example, a set of one or more infrared LEDs (Light Emitting Diodes). The illumination source 106 is configured to illuminate an illuminated area 110 located in front of the display screen 102.

The illuminated area 110 intersects the field-of-view 108 to define an intersection region 112 in front of the display screen 102. The illumination source 106 may be controlled to illuminate while the camera 104 is capturing one or more images (e.g., the illumination source 106 may be turned on before the camera 104 captures images). The captured camera images may be analyzed (e.g., by one or more processors) to detect one or more illuminated objects within the intersection region 112. An object may be, for example, a hand, finger, other body part, a stylus, pointer, remote control device, game controller, etc. Objects within the field-of-view 108 but outside of the intersection region 112 may be ignored. That is, the camera 104 and the illumination source 106 are positioned such that control objects such as a user's hand are included in the intersection region 112 but other objects such as a user's head or torso are not included in the intersection region 112 (even if the other objects are included in the field-of-view 108 and/or the illuminated area 110).

For example, as shown in FIG. 1, a user 114 is standing in front of the display screen 102. The user 114 extends a hand 116 so that it is positioned within the intersection region 112. The illumination source 106 illuminates the hand 116 and may illuminate other objects, such as the head of the user 114. The camera 104 may capture one or more images while the hand 116 is within the intersection region 112. A processor may analyze the camera images for illuminated objects. Because the hand 116 is within the intersection region 112, the processor detects the hand 116 as an illuminated object.

In addition, by analyzing the camera images for illuminated objects, the processor is able to ignore objects that are outside of the intersection region 112 and that are unrelated to the input being provided by the user 114 with the user's hand 116. For instance, the illumination source 106 illuminates a portion of the user's head and the camera 104 captures images of the arm and torso of the user 114. However, because the portion of the user's head is not within the field of view of the camera 104 and the arm and torso of the user 114 are not illuminated by the illumination source 106, the processor ignores these objects when attempting to detect an object providing user input.

As will be described in more detail below, objects may be detected, for example, by comparing pixels of the camera images to a brightness threshold to produce a binary image and by clustering pixels within the binary image into one or more blobs based on whether a tracking mode is a single hand tracking mode, a two hand adjacent tracking mode, or a two hand stacked tracking mode. One or more object positions may be determined based on the results of the clustering.

A user input may be determined based on the detection of one or more objects within the intersection region 112. For example, the position of a detected object may be mapped to a user interface of an application displayed on the display screen 102. As another example, movement of the object in a horizontal and/or vertical direction may be detected. In addition, a gesture may be detected based on one or more determined positions of the detected object. A "swipe" gesture, a "clap" gesture, a "pounding" gesture, a "chopping" gesture, or a "grab" gesture may be detected, to name a few examples.

As used herein throughout, a "gesture" is intended to refer to a form of non-verbal communication made with a whole or part of a human body or multiple human bodies, and is contrasted with verbal communication such as speech. For instance, a gesture may be defined by a movement, change or transformation between a first position, pose, or expression and a second pose, position or expression. Example gestures include for instance, an "air quote" gesture, a bowing gesture, a curtsey, a cheek-kiss, a finger or hand motion, a genuflection, a head bobble or movement, a high-five, a raised fist, a salute, a swiping or wave motion, a thumbs-up motion, or a finger pointing gesture.

Accordingly, from a sequence of images, a gesture may be derived that defines an idea, opinion, emotion, communication, command, demonstration or expression of the user. For instance, the user's gesture may be a single or multiple finger gesture; a single hand gesture; a single hand and arm gesture; a single hand and arm, and body gesture; a bimanual gesture; or a transformation of any other expressive body state.

For brevity, the body part or parts used to perform relevant gestures are generally referred to as an "object." For instance, the user may express a command using their entire body or with other physical objects, in which case their entire body or the other physical objects may be the object. A user may more subtly express a command by wiggling a finger, in which case the finger may be the object. The user's gesture in a single image or between two images may be expressive of an enabling or "engagement" gesture. An object may also be a physical device, such as an infrared finger light, a retro-reflector, or a remote control.

An application displayed on the display screen 102 may be controlled based on the determined user input. For example, if a swipe gesture is detected, a next picture may be displayed in a photo viewing application. As another example, if a "pounding" gesture is detected, a drum noise may be played based on a detected object position matching a corresponding position of a graphic of a drum displayed on the user interface displayed on the display screen 102. As yet another example, a television channel may be changed based on a detected change in vertical position (e.g., up, down) of the detected object.

FIG. 2A illustrates a front view of a tracking system 200. The system 200 includes a camera 202 positioned at a top side of a display screen 204 and an illumination source 206 positioned at a bottom side of the display screen 204. The lens of the camera 202 may be positioned a particular distance (e.g., five centimeters, ten centimeters) above the top side of the display screen 204. The illumination source 206 may include a row of multiple illuminators (e.g., multiple infrared LEDs and may be positioned a particular distance (e.g., five centimeters, ten centimeters) below the bottom side of the display screen 204. The display screen 202 may be, for example, a twenty one inch computer monitor (e.g., the distance from one corner of the display screen 204 to the opposite corner may be twenty one inches).

FIG. 2B illustrates a side view of a tracking system 215. The system 215 includes a camera 220 positioned at a top side of a display screen 222. The camera 220 is angled downward relative to the display screen 222. The camera 220 may be positioned, for example, at a thirty degree angle. An illumination source 224 is positioned at the bottom side of the display screen 222 and is angled upward towards the display screen 222. The illumination source 224 may be positioned, for example, at a thirty degree angle. The positions (e.g., distances from the display screen 222, angles) of the illumination source 224 and the camera 220 may be configured such that control objects (e.g., hand, pointer) used by typical users are captured within an intersection region defined by the intersection of the field-of-view of the camera 220 and an illuminated area illuminated by the illumination source 224 and so that objects not intended as control objects are not captured in the intersection region.

The angle of the camera 220 and/or the angle of the illumination source 224 may affect the size and location of an intersection region defined by the intersection of the field-of-view of the camera 220 and an illuminated area illuminated by the illumination source 224. Additionally, the size and location of the intersection region may affect detection of objects in the intersection region. For example, if the angle of the camera 220 is configured so that the camera 220 is facing relatively straight out (e.g., at a small angle relative to a horizontal plane), an object may not be detected (e.g., may not be in the field-of-view of the camera 220) if the object is close to the display screen 222 and/or near the bottom of the display screen 222. Additionally, in such a configuration it may be difficult to detect an object such as a user's hand because the hand may be in front of other objects such as the user's head or torso in the captured camera image, making it difficult to distinguish the hand.

As another example, if the angle of the camera 220 is about forty-five degrees to a display screen, it may become difficult to distinguish between a user's in-and-out movements and a user's up-and-down movements (e.g., both movements may appear similar in a sequence of captured camera images). In addition, if the angle of the camera 220 is configured so that the camera 220 is facing relatively straight down (e.g., at a small angle relative to a vertical plane), a user's up-and-down movements may be difficult to track. An example configuration of camera angle and illumination source angle creates an intersection region that is close enough to the display screen 222 so that a user's outstretched hand or finger may be detected and so that the user's arm, torso, or head are not detected (e.g., such as the intersection region 112 shown in FIG. 1).

In some implementations, a "sharp edge" (e.g., steep change in intensity over a short distance) to the illuminated area is created by the illumination source 224 in order to reduce (e.g., minimize) the area where an object may be detected unreliably because it is illuminated by weak or extraneous infrared light from the illumination source 224. To create a sharp edge to the illuminated area, LEDs with a narrow angle lens may be used, such as LEDs with a small angle of half intensity (e.g., where the angle of half intensity defines how far from center an LED drops to half of its maximum intensity). An LED with a narrow-angled lens produces a relatively steep drop-off of light intensity as compared to LEDs with wider-angled lens. Using an LED with a narrow-angled lens forms a narrower but more sharply defined illumination region as compared with using an LED with a wider-angled lens.

An LED lens that produces an oval illumination pattern may be used, so that the angle of half intensity of the lens in one dimension is narrow, and the angle of half intensity in the other dimension for the lens is wider. Using lenses that produce oval illumination patterns, may allow for LEDs to be spaced further apart than if other types of LEDs are used.

Multiple rows of LEDs may be used. For example, the illumination source 224 may be a first row of LEDs and an illumination source 226 may be a second row of LEDs. The illumination source 224 may be a row of narrow-angled LEDs which produce a sharp illuminated edge and the illumination source 226 may be a row of wider-angled LEDs which illuminate an area between the illuminated area created by the illumination source 224 and the display screen 222.

A sharp illuminated edge may also be created by using a channel, shield, or mirror which blocks emitted light on one side, thereby producing an illumination region where the edge nearest the channel, shield, or mirror is sharp while the edge near the surface of the display screen 222 is a softer illuminated edge. As another example, a sharp edge may be created by using a custom asymmetric lens.

Figure 3:
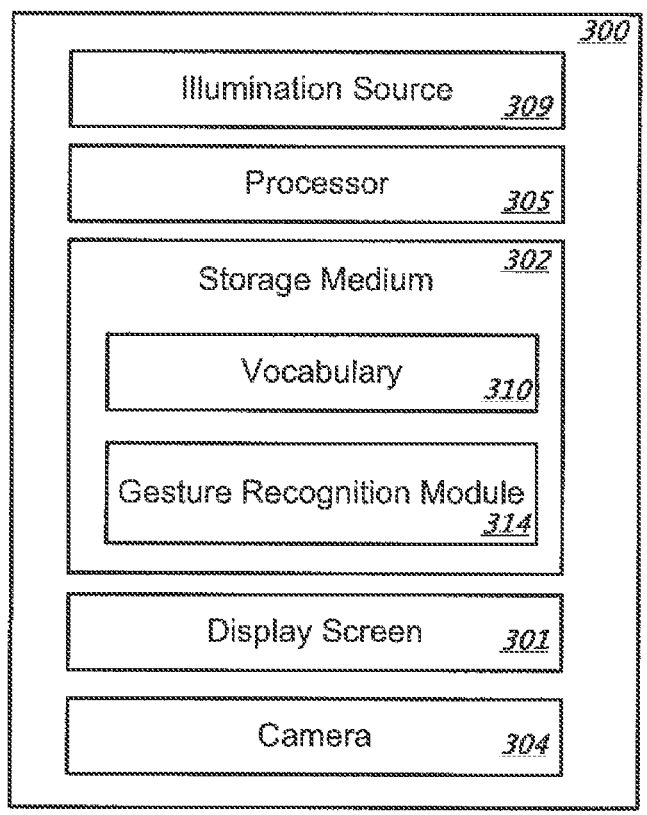

FIG. 3 illustrates an example of a tracking system 300. The system 300 includes a display screen 301, a storage medium 302, a camera 304, a processor 305, and an illumination source 309. The system 300 may be included in or used in conjunction with a digital picture frame, a television, a monitor, a product display unit, or any type of media system.

The display screen 301 renders a visual display image. For example, the display screen 301 may be a monitor display, a television display, a liquid crystal display (LCD), a plasma display device, a projector with a projector screen, an auto-stereoscopic display, a cathode ray tube (CRT) display, a digital light processing (DLP) display, a digital picture frame display, or any other type of display device configured to render a visual display image. The display screen 301 may include one or more display devices. The display screen 301 may display images associated with an application. For instance, the display screen 301 may render display images generated by an application (e.g., a photo viewing application). The display images generated by the application may include a user interface with interface controls.

The camera 304 is a device that captures images. For example, the camera 304 may be a digital camera, a digital video camera, or any other type of device that captures images. In some implementations, the camera 304 may be a single camera and the system 300 may include only the single camera. In other implementations, multiple cameras may be used. The camera 304 may capture images of an object interacting with an interface displayed on the display screen 301. For instance, the camera 304 may capture images of a user or person physically interacting (e.g., with a finger or hand) with an interface displayed on the display screen 301. The camera 304 may be any type of image sensor and may be a line scan sensor.

The illumination source 309 is a device that provides a light source. For example, the illumination source 309 may be a flash device, an incandescent light bulb, a fluorescent light bulb, an LED, a halogen light source, a neon light source, a xenon light source, an infrared light source, or any other type of device configured to illuminate an object being imaged by the camera 304. A flash device may, over one or more cycles, project electromagnetic radiation and then extinguish the projected electromagnetic radiation.

The illumination source 309 may include one or more illuminators. The illumination source 309 may generate light to assist in capturing a high quality image of an object being captured by the camera 304. In some implementations, the illumination source 309 may be used in particular situations. For instance, the illumination source 309 may be used at nighttime or in dark rooms. The illumination source 309 may be positioned to define an intersection region within the field of view of the camera 304. Defining an intersection region using the illumination source 309 may increase the accuracy of object detection with a single camera and also may increase the number of control objects that may be detected by a single camera. Using a single camera may help reduce costs of the system and enable gesture-based input control to be realized in less expensive devices.

The storage medium 302 stores and records information or data, and may be an optical storage medium, magnetic storage medium, flash memory, or any other storage medium type. The storage medium 302 includes a vocabulary 310 and a gesture recognition module 314. The vocabulary 310 includes information regarding gestures that the system 300 may recognize. For example, the vocabulary 310 may include gesture definitions which describe, for each recognized gesture, a set of movements included in a gesture. The gesture recognition module 314 receives captured images from the camera 304, maps a position of a detected object to an interface displayed on the display screen 301, and detects a gesture based on comparing positions of the detected object within a series of images to gesture definitions stored in the vocabulary 310 to determine whether a recognizable gesture has been performed.

The processor 305 may accept input from a user interface displayed on the display screen 301 and may analyze images captured by the camera 304. The processor 305 may execute applications and operating systems being run on the system 300. The system 300 may include multiple processors (or other control circuitry) and may include memory (or other computer-readable storage media) that stores application programs, operating systems, user input programs, and data used by the application programs, operating systems, and user input programs.

In some implementations, the system 300 does not include the display screen 301. For example, the system 300 may be configured to detect objects in an intersection region where the intersection region is located in front of a different physical object such as a door, elevator, machine, radio, media player, or other object. In some examples, the system 300 is located in front of an area of space, such as a doorway or entryway.

Figure 4:
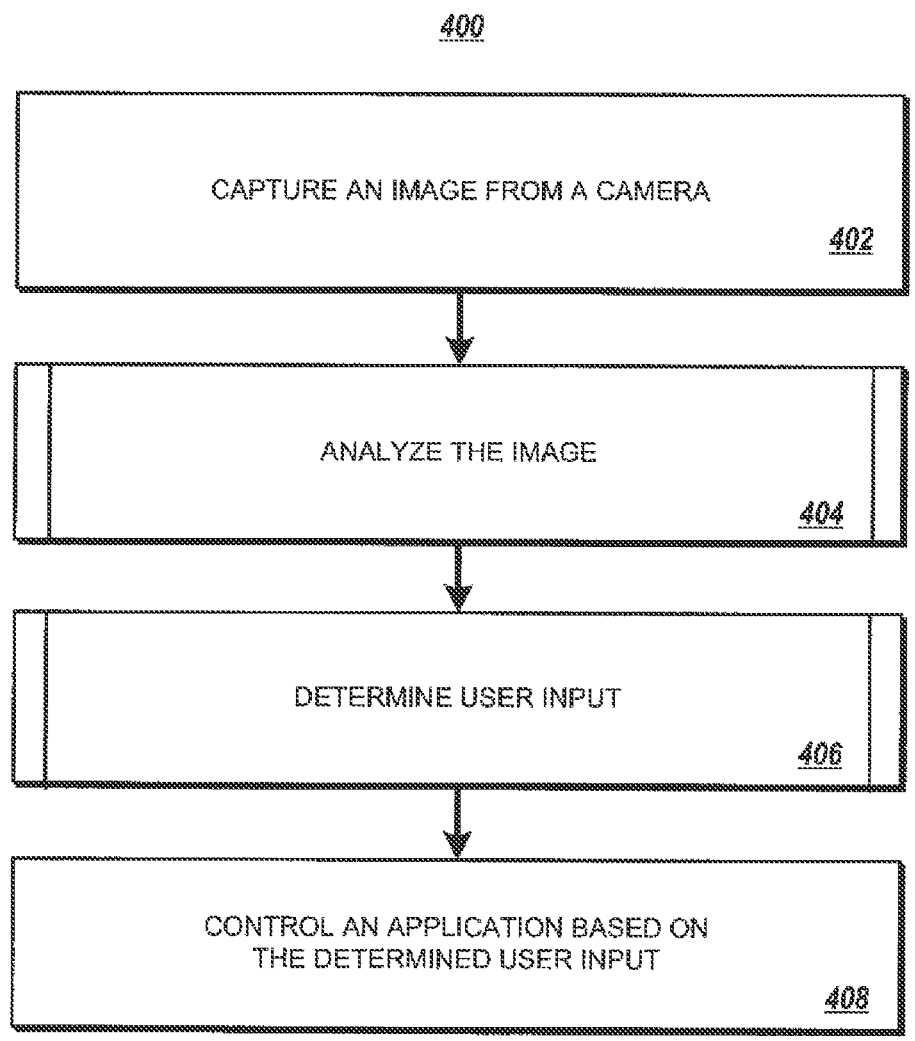
FIGS. 4, 5, 6, 9, 14, and 17 are flowcharts of exemplary processes.

FIG. 4 illustrates a process 400 for controlling an application. The operations of the process 400 are described generally as being performed by the system 300. The operations of the process 400 may be performed exclusively by the system 300, may be performed exclusively by another system, or may be performed by a combination of the system 300 and another system. In some implementations, operations of the process 400 may be performed by one or more processors included in one or more electronic devices.

The system 300 captures an image from a camera (402). For example, in reference to FIG. 1, an image may be captured by the camera 104. In some implementations, the system 300 may control the illumination source 106 to illuminate while the camera 104 is capturing an image (e.g., the illumination source 106 may be turned on prior to the capturing of images by the camera 104).

In some implementations, the illumination source is controlled to illuminate in sequence with images captured by the camera in an alternating pattern such that a first image captured by the camera is captured when the illumination source is illuminated and a second image captured by the camera is captured when the illumination source is not illuminated. The captured camera image may include an intersection region which is defined by the intersection of the field-of-view of the camera and an area illuminated by an illumination source.

In some implementations, the intersection region is located in front of a display screen. In other implementations, the intersection region is located in front of another type of object, such as a radio, elevator, painting, manufacturing device, automatic teller machine, light switch, vending machine, beverage dispenser, or any other physical object. In some implementations, the intersection region is located in front of an area of space, such as a doorway.

The system 300 analyzes the image captured by the camera to detect an object within the intersection region (404). For example, in reference to FIG. 1, the hand 116 located within the intersection region 112 is detected while the head, arm, or torso of the user 114 which are located outside of the intersection region 112 are not detected. The system 300 may ignore objects that are within the camera's field of view and outside of the intersection region by analyzing the image for illuminated objects. Because any objects within the camera's field of view and outside of the intersection region are not illuminated, the system 300 ignores (e.g., does not detect) these objects.

In implementations where alternating camera images are captured while an illumination source is turned on, a camera image captured while the illumination source is turned off may be subtracted from a camera image captured while the illumination source was turned on to produce a resulting image. The resulting image may be analyzed to determine whether one or more objects are illuminated in the camera image captured when the illumination source was turned on. Subtracting the camera image captured when the illumination source was turned off may remove ambient light which was present in both camera images.

In some implementations, the system 300 detects an object within an image by analyzing multiple images taken over time to detect moving objects. The system 300 may use an optical flow process or examine a motion history image to detect objects in motion. In these implementations, the system 300 tracks the objects in motion and ignores static objects. For example, in a situation in which a user's hand and the user's face are present within an intersection region and the user is moving his or her hand while keeping his or her face stationary, the system 300 detects and tracks the moving hand as an object of interest, but does not track the user's face as an object of interest.

In some examples, the system 300 detects an object within an image by analyzing shapes within the image. In these examples, the system 300 may attempt to detect a hand within the intersection region of the image. In attempting to detect a hand, the system 300 may compare shapes of illuminated objects within the image to a shape of a typical hand. When the system determines that a shape of an illuminated object matches the shape of the typical hand, the system 300 detects and tracks the object as an object of interest. When the system determines that a shape of an illuminated object does not match the shape of the typical hand, the system 300 does not track the object as an object of interest. Analyzing a camera image to detect an object within the intersection region is described in more detail below with respect to FIG. 5.

Figure 5:
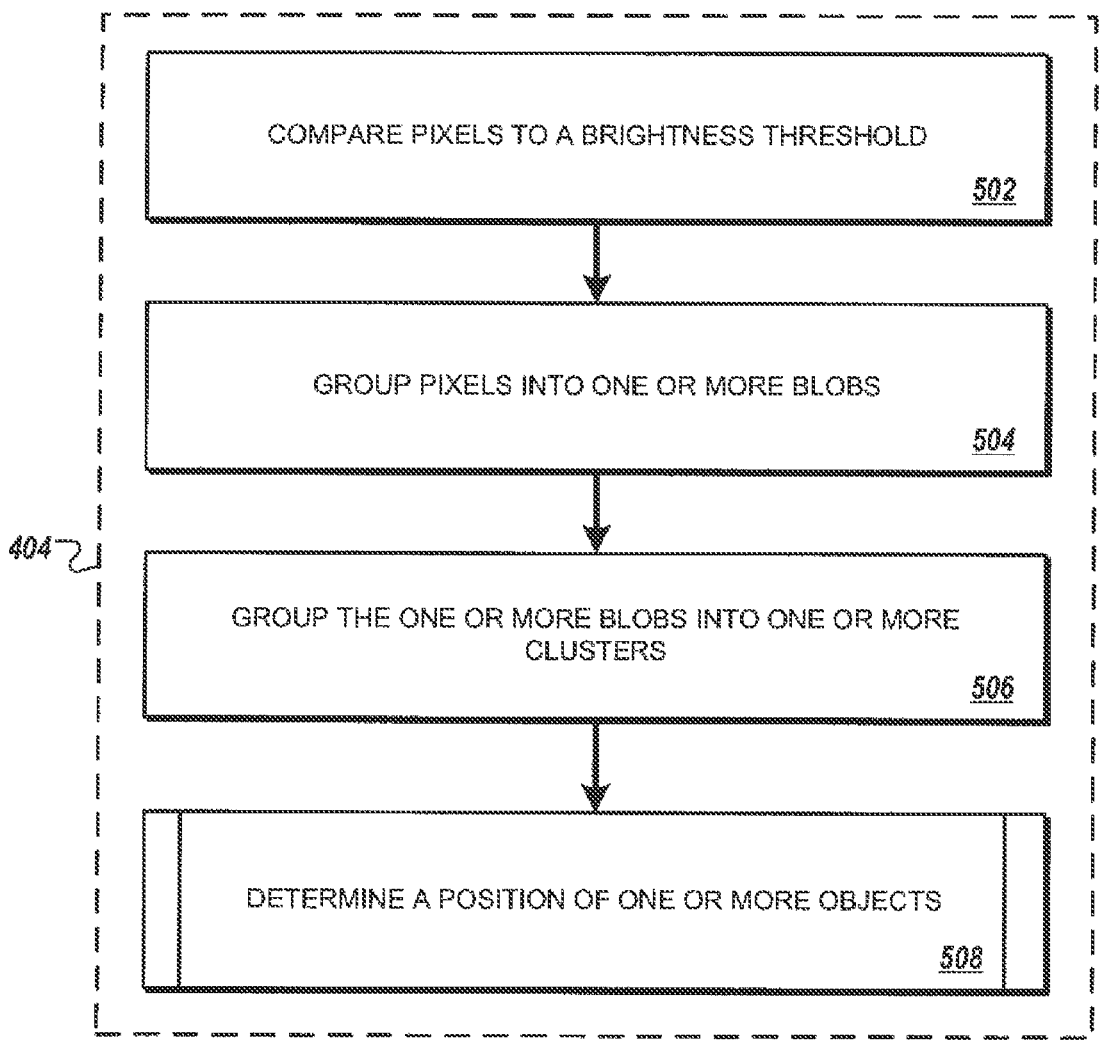

FIG. 5 illustrates a process 500 for analyzing a camera image to detect an object within an intersection region. The operations of the process 500 are described generally as being performed by the system 300. The process 500 may used in analyzing an image captured by the camera to detect an object within the intersection region referenced above with respect to reference numeral 404. The operations of the process 500 may be performed exclusively by the system 300, may be performed exclusively by another system, or may be performed by a combination of the system 300 and another system. In some implementations, operations of the process 500 may be performed by one or more processors included in one or more electronic devices.

The system 300 compares pixels of the image captured by the camera to a brightness threshold to produce a binary image (502). For example, pixels in the camera image having a brightness value above a threshold may be identified in the binary image with a value of one and pixels having a brightness value below the threshold may be identified in the binary image with a value of zero.

The system 300 groups pixels within the binary image into one or more blobs (504). For example, pixels may be clustered into one or more blobs based on proximity of the pixels together.

The system 300 groups one or more blobs within the binary image into one or more clusters based on a tracking mode (506). For example, blobs may be clustered into one or more clusters based on whether a tracking mode is a single object tracking mode, a two object adjacent tracking mode, or a two object stacked tracking mode.

The system 300 determines a position of one or more objects in the image captured by the camera based on the one or more clusters (508). For example, a position of a user's hand or finger, two hands, a stylus or other pointing device, a game controller, a remote control, or some other object may be determined Determining the position of one or more objects based on a tracking mode is discussed in more detail below with respect to FIG. 6.

Figure 6:
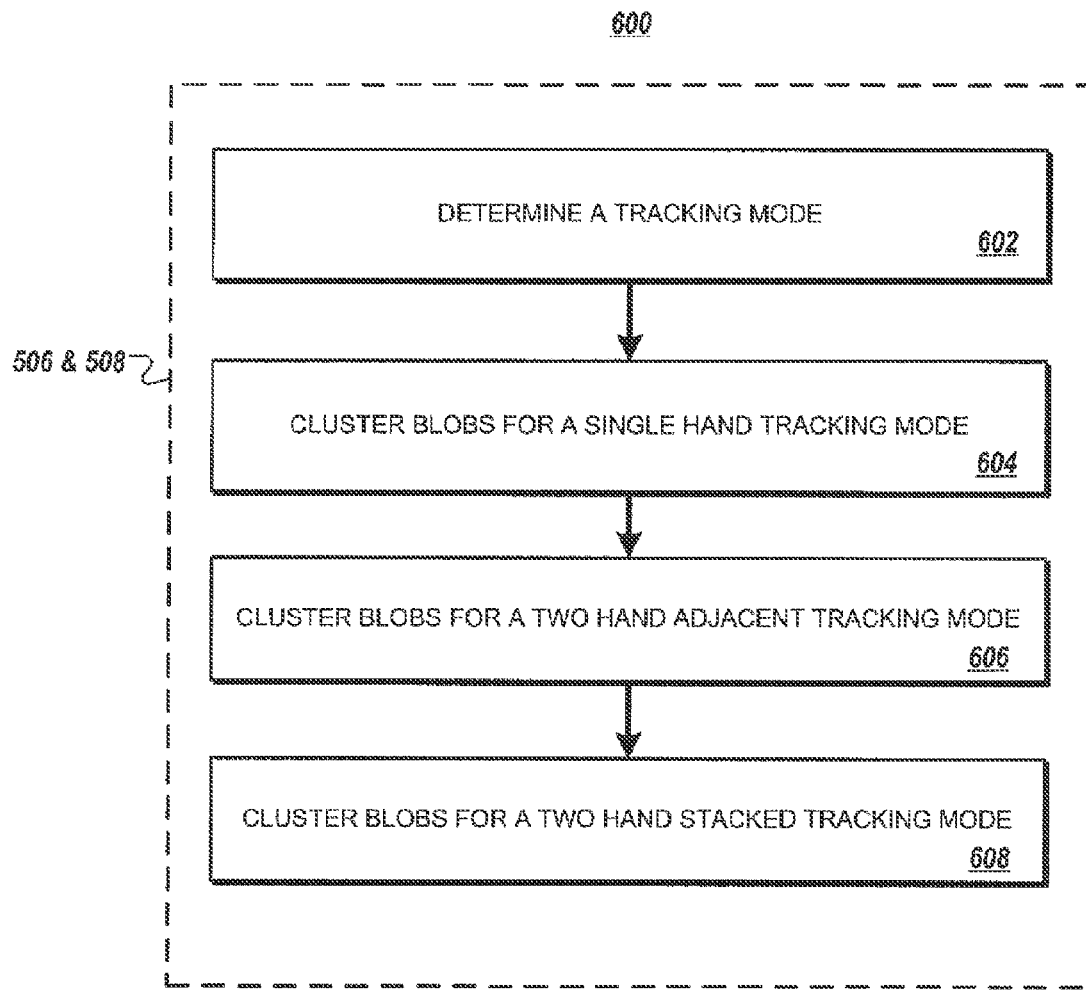

FIG. 6 illustrates a process 600 for determining a position of one or more hands based on a tracking mode. The process 600 may used in grouping blobs within the binary image into one or more clusters based on a tracking mode referenced above with respect to reference numeral 506 and in determining a position of one or more objects in the image captured by the camera based on the one or more clusters referenced above with respect to reference numeral 508. The process 600 may be used to detect objects other than hands, such as fingers, pointing devices, etc.

The operations of the process 600 are described generally as being performed by the system 300. The operations of the process 600 may be performed exclusively by the system 300, may be performed exclusively by another system, or may be performed by a combination of the system 300 and another system. In some implementations, operations of the process 600 may be performed by one or more processors included in one or more electronic devices.

The system 300 determines a tracking mode from among at least a single hand tracking mode, a two hand adjacent tracking mode, and a two hand stacked tracking mode (602). For example, a current tracking mode setting may be retrieved from the storage medium 302 referenced above with respect to FIG. 3. In this example, the current tracking mode setting may be set based on user input (e.g., input setting the tracking mode as one of a single hand tracking mode, a two hand adjacent tracking mode, and a two hand stacked tracking mode).

In another example, the current tracking mode setting may be set based on which application is being controlled by the system 300. In this example, the system 300 may provide multiple applications (e.g., multiple games) that are controlled using different types of user input. The current tracking mode, therefore, is set based on the application being used and the type of input expected by that application.

In a single hand tracking mode, the system 300 may detect the position of a single hand (or other object). In a two hand adjacent tracking mode, the system 300 may detect the position of two hands, where the two hands are held side by side in a horizontal orientation, with a gap between the two hands. In a two hand stacked tracking mode, the system 300 may detect the position of two hands, where the two hands are stacked vertically, one on top of the other, with a gap between the two hands.

In response to the determined tracking mode being the single hand tracking mode, the system 300 clusters blobs within the binary image into a single cluster and determines a position of the single hand based on the single cluster (604). For example, the system 300 may cluster blobs within a binary image which was created based on performing a threshold brightness test as discussed above with respect to reference numeral 502. Blobs may be clustered in the binary image using a k-means process, with a desired cluster count equal to one.

The system 300 may determine a position of the single hand based on the single cluster by computing a centroid of one or more blobs within the image. For example, when the single cluster includes a single blob, the system 300 computes a centroid of the single blob and uses the computed centroid as the position of the single hand.

In another example, when the single cluster includes multiple blobs, the system 300 computes a centroid of each of the multiple blobs and computes a weighted combination of the computed centroids as the position of the single hand. In this example, the system 300 determines a weighting for the centroids based on a size of the corresponding blob and applies the determined weighting in combining the centroids to a position.

In response to the determined tracking mode being the two hand adjacent tracking mode, the system 300 clusters blobs in a horizontal direction from an outer edge of first and second sides of the image to a center of the image to identify a first cluster at the first side of the image and a second cluster at the second side of the image, determines a position of a first hand based on the first cluster, and determines a position of a second hand based on the second cluster (606). Blobs may be clustered, for example, using a k-means process with a desired cluster count equal to two. In some scenarios, such as if one hand is within the intersection region or if the user's two hands are placed close together, one blob may be detected and a centroid of the one blob may be computed as a position of a single detected hand. In these scenarios, the system 300 may indicate that, even though a two hand tracking mode is set, only a single hand was found.

In situations in which only a first blob and a second blob are present within the image, the system 300 computes a first centroid of the first blob as a position of the first hand and computes a second centroid of the second blob as a position of the second hand. In situations in which more than two blobs are present within the image, the blobs may be clustered into a first cluster and a second cluster, for example, using a k-means process with a desired cluster count equal to two.

When the first cluster includes a single blob, the system 300 computes a centroid of the single blob and uses the computed centroid as the position of the first hand. When the first cluster includes multiple blobs, the system 300 computes a centroid of each of the multiple blobs and computes a weighted combination of the computed centroids as the position of the first hand. In this example, the system 300 determines a weighting for the centroids based on a size of the corresponding blob and applies the determined weighting in combining the centroids to a position.

When the second cluster includes a single blob, the system 300 computes a centroid of the single blob and uses the computed centroid as the position of the second hand. When the second cluster includes multiple blobs, the system 300 computes a centroid of each of the multiple blobs and computes a weighted combination of the computed centroids as the position of the second hand. In this example, the system 300 determines a weighting for the centroids based on a size of the corresponding blob and applies the determined weighting in combining the centroids to a position.

Figure 7:
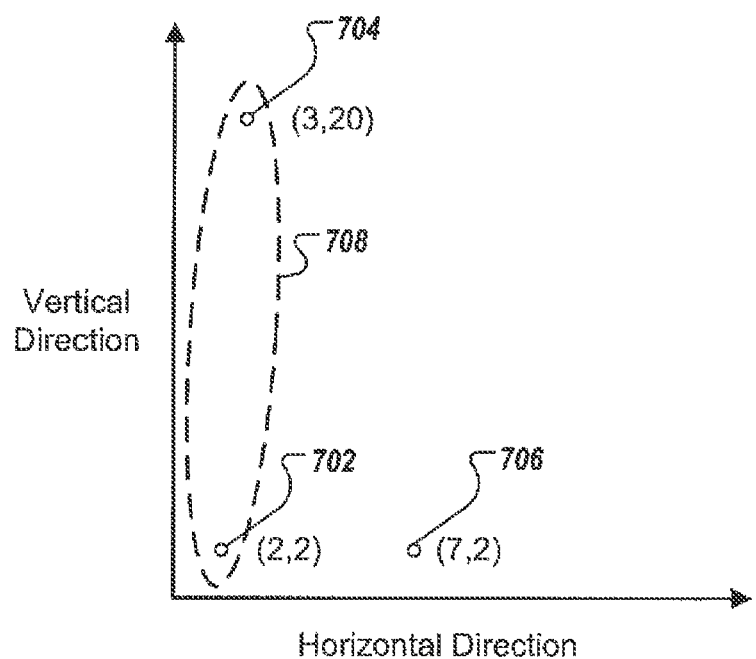
FIGS. 7 and 8 are diagrams of exemplary clusters.

In a two hand adjacent tracking mode, proximity of blobs in the horizontal direction may be weighted higher than proximity of blobs in a vertical direction in clustering blobs into clusters. A distance function which weights proximity of blobs in the horizontal direction higher than proximity of blobs in the vertical direction may be provided to a k-means clustering process. For example, FIG. 7 illustrates a binary image map 700 which includes blob centroids 702-706 at coordinates (2,2), (3,20), and (7,2), respectively. As indicated by a dashed oval 708, the blob centroids 702 and 704 may be clustered together in a two hand adjacent tracking mode. The blob centroid 702 may be clustered with the blob centroid 704 rather than with the blob centroid 706 despite the fact that the distance between the blob centroid 702 and the blob centroid 706 is less than the distance between the blob centroid 702 and the blob centroid 704 and despite the fact that the blob centroid 702 and the blob centroid 706 share the same Y coordinate. The blob centroid 702 may be clustered with the blob centroid 704 rather than with the blob centroid 706 because the difference in the horizontal direction between the blob centroid 702 and the blob centroid 704 (i.e., one pixel) is less than the difference in the horizontal direction between the blob centroid 702 and the blob centroid 706 (i.e., five pixels).

Returning to FIG. 6, in response to the determined tracking mode being the two hand stacked tracking mode, the system 300 clusters blobs in a vertical direction from an outer edge of a top and a bottom of the image to a center of the image to identify a first cluster at the top of the image and a second cluster at the bottom of the image, determines a position of a first hand based on the first cluster, and determines a position of a second hand based on the second cluster (608). Similar to the two hand adjacent tracking mode, blobs may be clustered using a k-means process with a desired cluster count equal to two and in some scenarios, such as if one hand is within the intersection region or if the user's two hands are placed close together, one blob may be detected and a centroid of the one blob may be computed as a position of a single detected hand.

In situations in which only a first blob and a second blob are present within the image, the system 300 computes a first centroid of the first blob as a position of the first hand and computes a second centroid of the second blob as a position of the second hand. In situations in which more than two blobs are present within the image, the blobs may be clustered into a first cluster and a second cluster, for example, using a k-means process with a desired cluster count equal to two.

When the first cluster includes a single blob, the system 300 computes a centroid of the single blob and uses the computed centroid as the position of the first hand. When the first cluster includes multiple blobs, the system 300 computes a centroid of each of the multiple blobs and computes a weighted combination of the computed centroids as the position of the first hand. In this example, the system 300 determines a weighting for the centroids based on a size of the corresponding blob and applies the determined weighting in combining the centroids to a position.

When the second cluster includes a single blob, the system 300 computes a centroid of the single blob and uses the computed centroid as the position of the second hand. When the second cluster includes multiple blobs, the system 300 computes a centroid of each of the multiple blobs and computes a weighted combination of the computed centroids as the position of the second hand. In this example, the system 300 determines a weighting for the centroids based on a size of the corresponding blob and applies the determined weighting in combining the centroids to a position.

Figure 8:
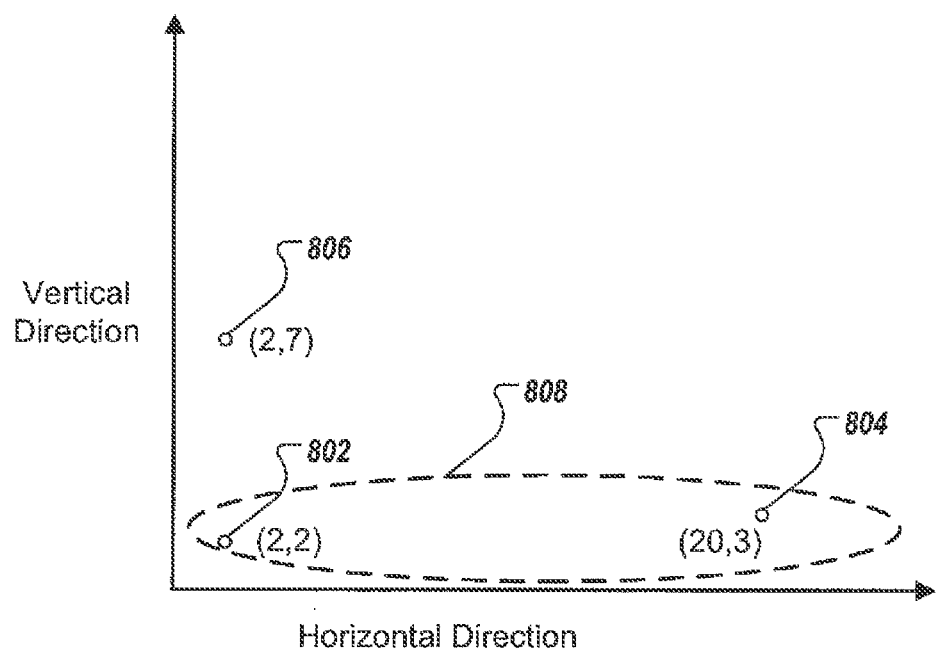

In a two hand stacked tracking mode, proximity of blobs in the vertical direction may be weighted higher than proximity of blobs in a horizontal direction in clustering blobs into clusters. A distance function which weights proximity of blobs in the vertical direction higher than proximity of blobs in the horizontal direction may be provided to a k-means clustering process. For example, FIG. 8 illustrates a binary image map 800 which includes blob centroids 802-806 at coordinates (2,2), (20,3), and (2,7), respectively. As indicated by a dashed oval 808, the blob centroids 802 and 804 may be clustered together in a two hand stacked tracking mode. The blob centroid 802 may be clustered with the blob centroid 804 rather than with the blob centroid 806 despite the fact that the distance between the blob centroid 802 and the blob centroid 806 is less than the distance between the blob centroid 802 and the blob centroid 804 and despite the fact that the blob centroid 802 and the blob centroid 806 share the same X coordinate. The blob centroid 802 may be clustered with the blob centroid 804 rather than with the blob centroid 806 because the difference in the vertical direction between the blob centroid 802 and the blob centroid 804 (i.e., one pixel) is less than the difference in the vertical direction between the blob centroid 802 and the blob centroid 806 (i.e., five pixels).

Returning to FIG. 4, the system 300 determines user input based on the object detected within the intersection region (406). For example, a gesture may be detected based on positions of the object detected within a series of images and a user input may be determined based on the recognized gesture. For example, a "swipe" user input may be detected and a "change station" user input may be determined based on the recognized swipe gesture. As another example, the position of the detected object may be mapped to a user interface control displayed by an application on a display screen. Determining user input for an application user interface is discussed in more detail below with respect to FIG. 9.

Figure 9:
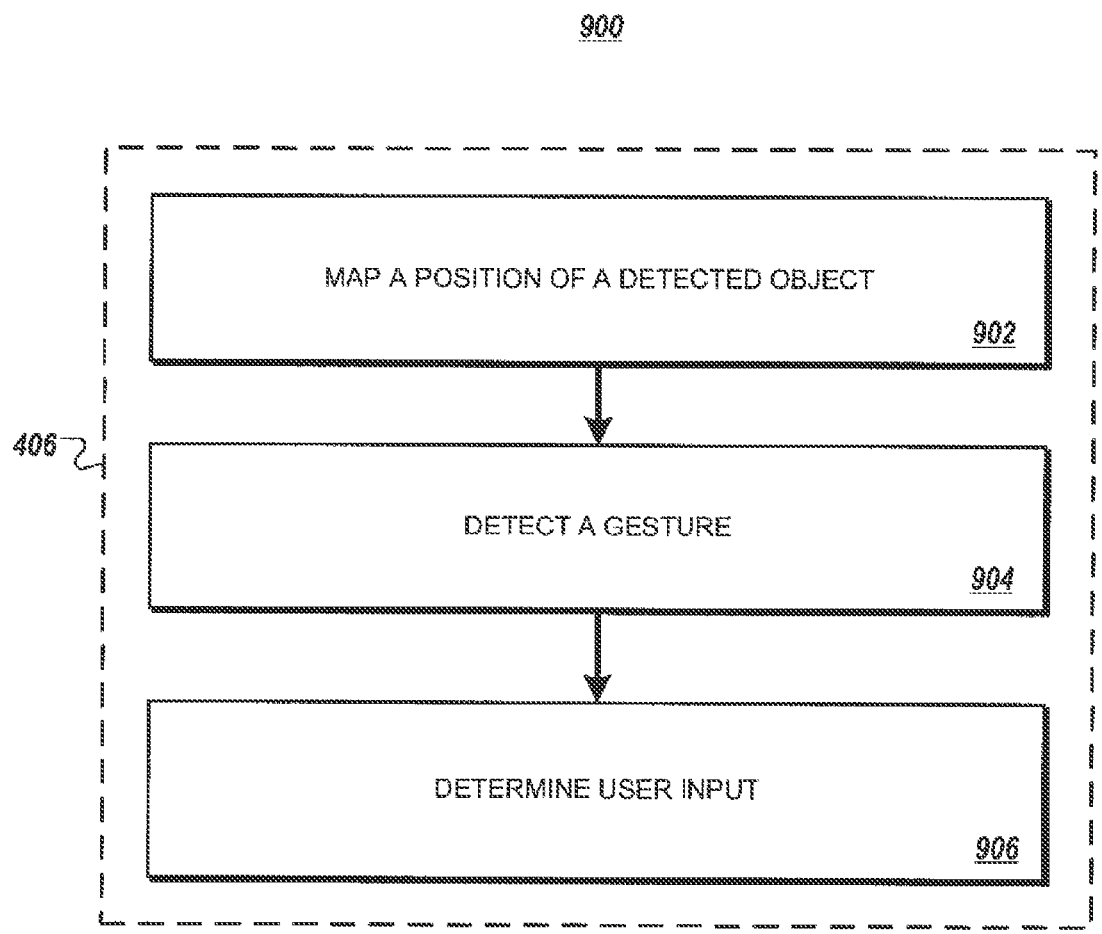

For example, FIG. 9 illustrates a process 900 for determining user input based on an object detected within an intersection region. The operations of the process 900 are described generally as being performed by the system 300. The process 900 may used in determining user input based on the object detected within the intersection region referenced above with respect to reference numeral 406. The operations of the process 900 may be performed exclusively by the system 300, may be performed exclusively by another system, or may be performed by a combination of the system 300 and another system. In some implementations, operations of the process 900 may be performed by one or more processors included in one or more electronic devices.

The system 300 maps a position of a detected object to an interface displayed by the application being controlled (902). For example, the position of the detected object in a binary image may be mapped to a user interface displayed on a display screen. The position of the detected object may be mapped to a user interface control or graphic displayed on the user interface. For some user interface controls, such as a slider control, the position of the detected object may be mapped to a particular location on the user interface control. As another example, the position of the detected object may be mapped to the position of a cursor displayed on the user interface.

The system 300 detects a gesture based on positions of a detected object with a series of images (904). For example, if the position of the detected object is mapped to a cursor position while in a single object tracking mode, a movement gesture may be detected within the series of images to detect movement of the object from a first position to a second position. As another example, in a single object tracking mode, a swipe gesture may be detected if multiple detected positions of the object within a series of images indicate a fast side-to-side horizontal movement of the object.

Other gestures may be detected if a tracking mode is, for example, a two hand adjacent tracking mode. For example, a "chop" gesture may be detected if positions of two objects within a series of images indicate that one detected object remains stationary and the other object moves quickly up and down in a vertical direction. As another example, a "drumming" gesture may be detected if positions of two objects within a series of images indicate that both objects move up and down. As yet another example, a "grab", or "move hands together" gesture may be detected if positions of two objects within a series of images indicate that both objects start side-by-side a particular distance apart and then move inward towards each other resulting in the two objects being close to one another. A "move hands apart" gesture may be detected if the positions of the two objects indicate that the objects start side-by-side and then move outward away from each other, resulting in the two objects being farther apart.

The system 300 determines user input based on the mapped position of the detected object and/or the detected gesture (906). For instance, in the example where the object is mapped to a cursor position and where a movement gesture is detected, a cursor movement user input may be determined. In the example where the mapped position of the detected object corresponds to an element displayed in the user interface displayed by the application being controlled, a command to select the user interface element may be determined.

Regarding detected gestures, in the example where a hand swipe gesture is detected, a "next photo" user input may be detected. In the example where a "chop" gesture is detected, a user input for a game may be determined which indicates a "swing" of a hammer or other object for a character within the game. In the example where "move hands together" or "move hands apart" gestures are detected, a decrease volume or increase volume user input may be determined, respectively, or a zoom in or a zoom out user input may be determined, respectively.

Figure 10:
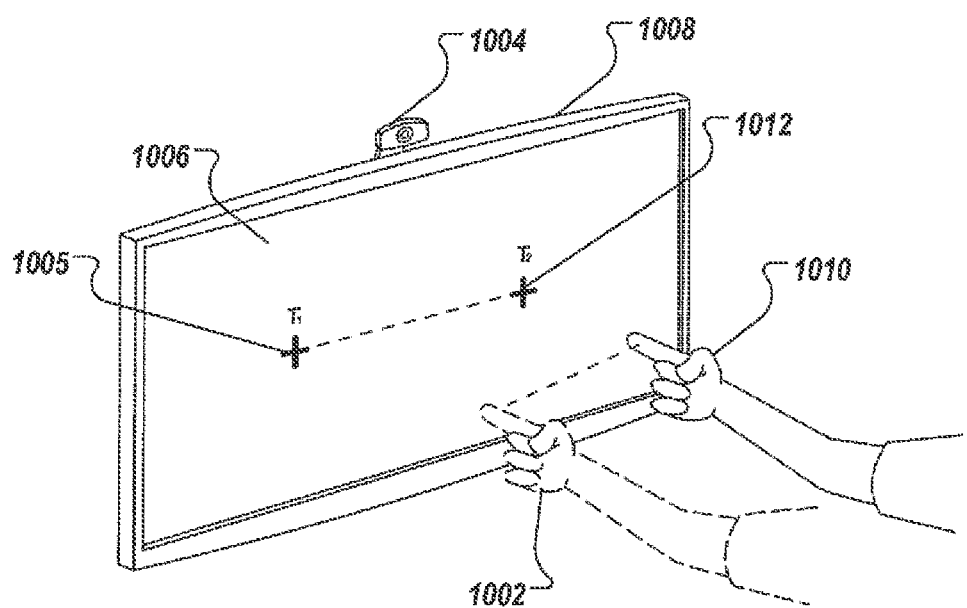
FIGS. 10, 11, 12, and 13 are diagrams of exemplary gestures and associated user interfaces.

Returning to FIG. 4, the system 300 controls an application based on the determined user input (408). For instance, FIG. 10 illustrates an example where movement of a cursor is controlled. In the example of FIG. 10, an object is mapped to a cursor position, a movement gesture is detected, a cursor movement user input is determined, and then movement of a cursor is controlled. For example, a hand 1002 is detected in a camera image captured by a camera 1004 at a first position and the position of the hand 1002 is mapped to a first cursor position 1005 on a user interface 1006 displayed on a display screen 1008. Movement of the hand 1002 is detected within a series of camera images captured by the camera 1004 and a second position of the hand 1002 is determined, as indicated by a hand 1010. A cursor movement user input is determined based on the detected movement gesture, and the position of the cursor is moved from the first cursor position 1005 to a second cursor position 1012 in a direction and magnitude corresponding to the difference in the detected positions of the hand 1002 and the hand 1010.

Figure 11:
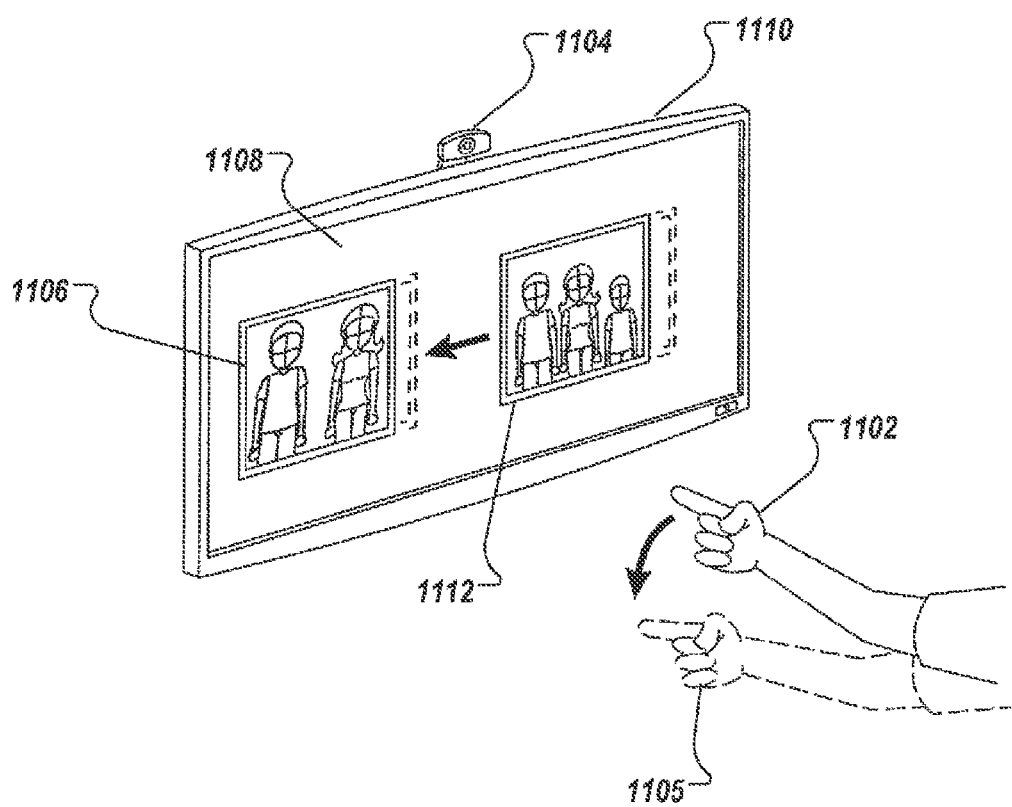

FIG. 11 illustrates an example where a photo viewing application is controlled to display a different photo. In the example of FIG. 11, a hand-swipe gesture is detected, a "next-photo" user input is determined, and a displayed photo is replaced with a new photo. For example, a hand 1102 is detected in a camera image captured by a camera 1104. The user moves their hand 1102 to the left in a swiping motion, as indicated by a hand 1105. Movement of the hand 1102 is detected within a series of camera images captured by the camera 1104 and a left swipe gesture is determined. A "next photo" user input is determined based on the detected left swipe gesture. A photo 1106 is displayed on a user interface 1108 displayed on a display screen 1110. Based on the determined "next photo" user input, the photo 1106 is removed from the user interface 1108 and a different, next photo 1112 is displayed in place of the photo 1106 on the user interface 1108.

Figure 12:
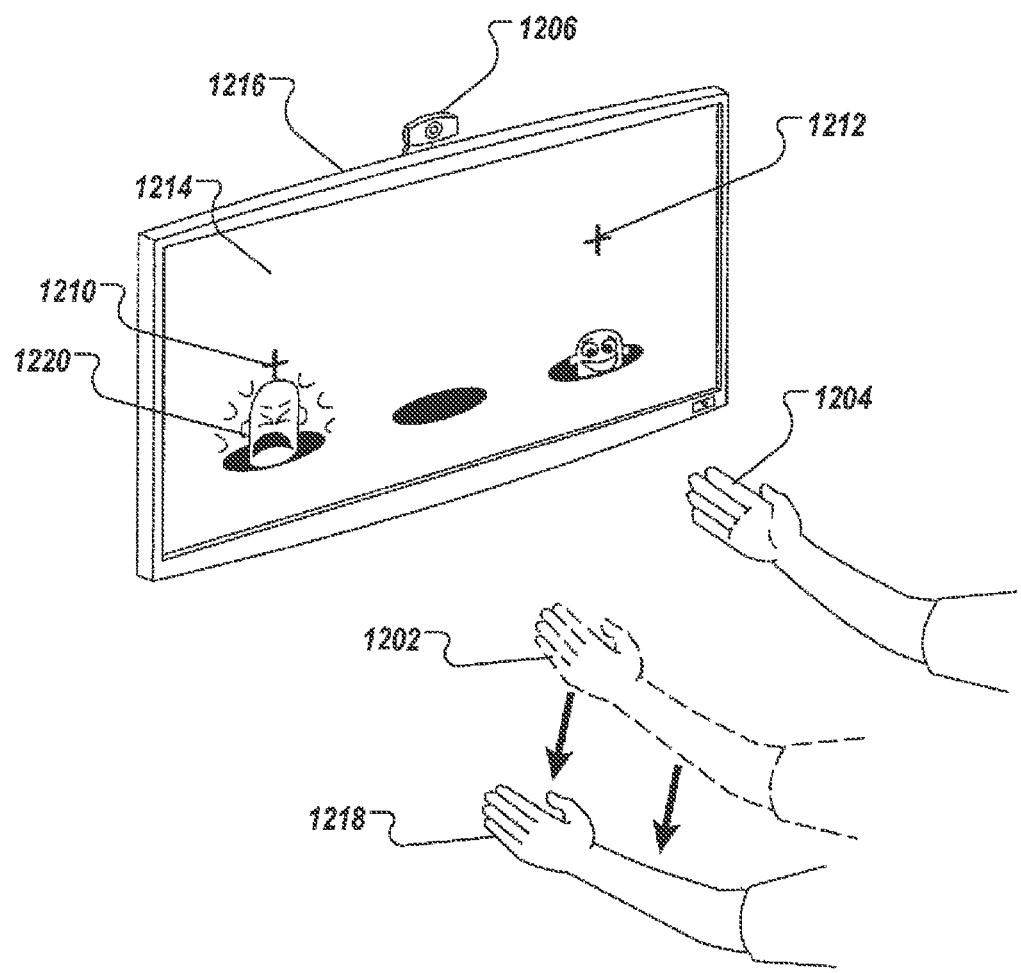

FIG. 12 illustrates an example where a game is controlled. For example, a left hand 1202 and a right hand 1204 are detected in one or more images captured by a camera 1206. The positions of the hands 1202 and 1204 are mapped to cursor positions 1210 and 1212, respectively, on a user interface 1214 displayed on a display screen 1216. The user makes a "chopping" gesture with their left hand 1202, as indicated by a hand 1218. Movement of the hand 1202 is detected within a series of images captured by the camera 1206 and a "chop" gesture is determined. A "pound character" user input is determined based on the chop gesture. A game animation is controlled based on the "pound character" user input.

For example, a state of an animated character graphic 1220 may be determined corresponding to the time of the detected chop gesture (e.g., the character graphic 1220 may be alternating between an "in the hole" state and an "out of the hole" state). If the character graphic 1220 is in an "out of the hole" state at the time of the detected chop gesture, it may be determined that the character associated with the character graphic 1220 has been "hit". The game may be controlled accordingly, such as to change the character graphic 1220 to a different graphic or to otherwise change the user interface 1214 (e.g., the character may "yell", make a face, get a "bump on the head", disappear, appear "knocked out", etc.), and/or a score may be incremented, or some other indication of success may be displayed.

Figure 13:
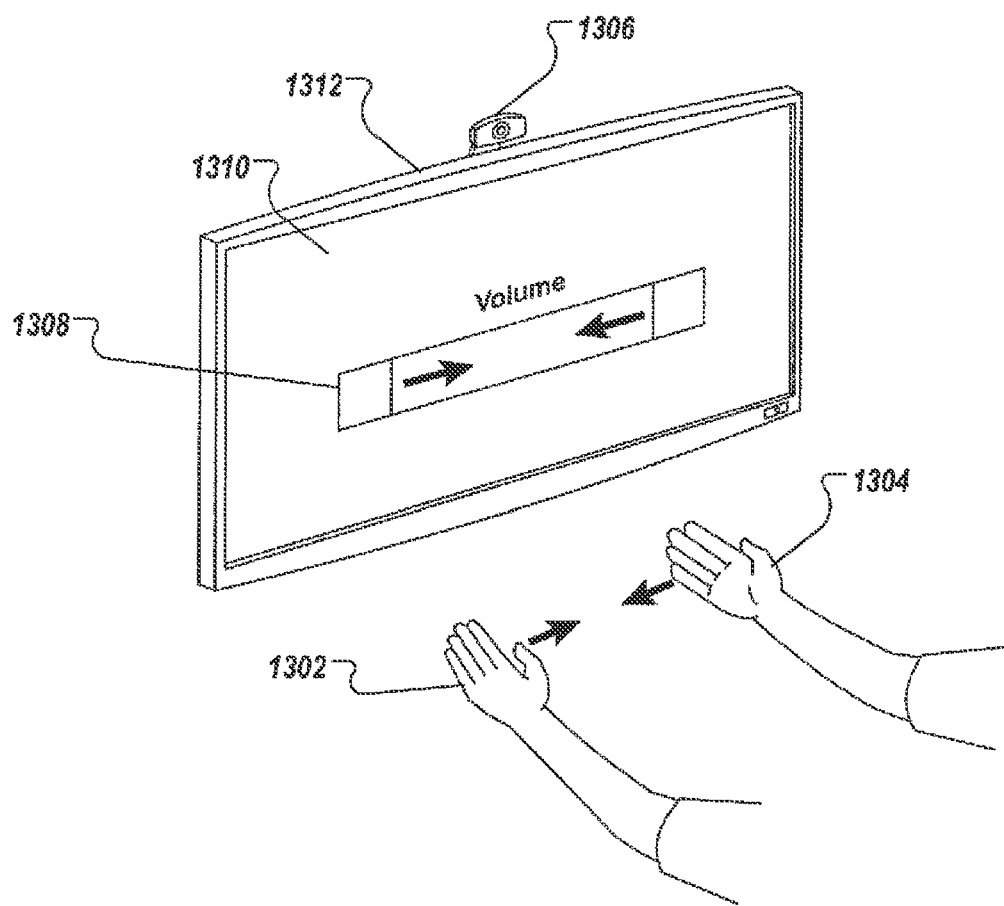

FIG. 13 illustrates an example where volume of a media player is controlled. For example, a left hand 1302 and a right hand 1304 are detected in one or more images captured by a camera 1306. The user makes a "move hands together" gesture by moving the hands 1302 and 1304 inward towards each other. The change in positions of the hands 1302 and 1304 are detected within a series of images captured by the camera 1306 and a "move hands together" gesture is detected. A decrease-volume user input command is determined based on the detected gesture. Volume of a media player application is decreased in a magnitude corresponding to the amount of horizontal movement of the hands 1302 and 1304 (e.g., a larger inward movement results in a larger decrease in volume). A volume indicator control 1308 on a user interface 1310 displayed on a display screen 1312 is updated accordingly to indicate the decreased volume. As another example, if the user makes a "move hands apart" gesture using the hands 1302 and 1304, the gesture may be detected, an increase-volume user input command may be determined, the volume of the media player application may be increased in a magnitude corresponding to the amount of outward movement of the hands 1302 and 1304, and the volume indicator control 1308 may be updated accordingly.

An application or system without a corresponding display screen may be controlled based on the determined user input. For example, the user input may be a "change station" user input determined based on a recognized swipe gesture performed in front of a car radio player and the car radio player may be controlled to change to a next station in a list of defined stations. As another example, the user input may be a "summon elevator" user input determined based on an object (e.g., hand) detected in front of an elevator door, and an elevator system may be controlled to transfer an elevator from another floor to the floor where the elevator door is located. As yet another example, the user input may be an "open door" user input based on a detected object (e.g., person) in front of a doorway, and a door may be opened in response to the user input.

Figure 14:
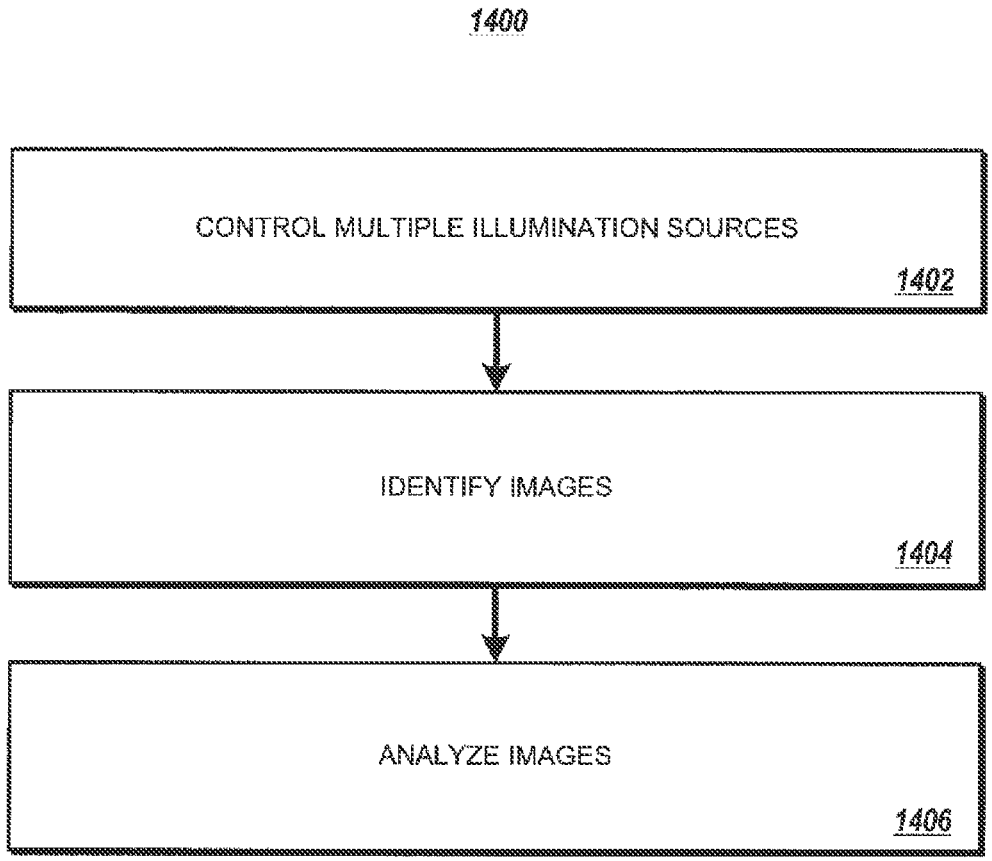

FIG. 14 illustrates a process 1400 for determining a position of an object. The operations of the process 1400 are described generally as being performed by the system 300. The operations of the process 1400 may be performed exclusively by the system 300, may be performed exclusively by another system, or may be performed by a combination of the system 300 and another system. In some implementations, operations of the process 1400 may be performed by one or more processors included in one or more electronic devices.

Figure 15:
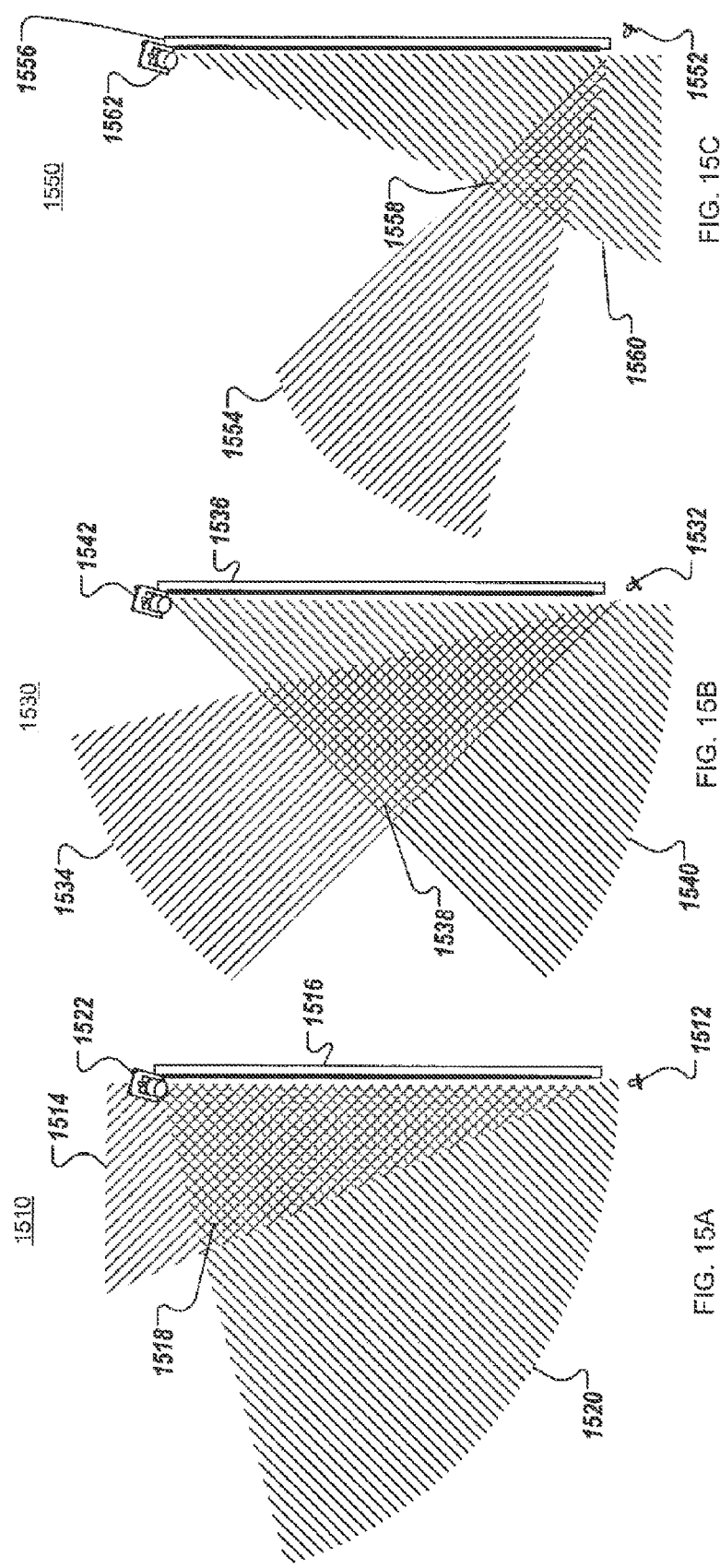

The system 300 controls multiple illumination sources to illuminate in sequence with images captured by a camera in an alternating pattern (1402). For example, multiple illumination sources may be positioned at an opposite side of a display screen from a camera. Each illumination source may be positioned at a different angle to illuminate a different illuminated area in front of the display screen. For example, FIGS. 15A-C illustrate various illumination source configurations. FIG. 15A illustrates a system 1510 in which an illumination source 1512 is positioned to produce an illuminated area 1514 in front of a display screen 1516. An intersection region 1518 is formed by the intersection of the illuminated area 1514 and a wide-angle field-of-view 1520 of a camera 1522. Most of the area of the intersection region 1518 is located near the top of the display screen 1516.

FIG. 15B illustrates a system 1530 in which an illumination source 1532 is positioned to produce an illuminated area 1534 angled further away from a display screen 1536 (e.g., as compared to the distance between the illuminated area 1514 and the display screen 1516). An intersection region 1538 located near the center of the display screen 1536 is formed by the intersection of the illuminated area 1534 and a medium-angle field-of-view 1540 of a camera 1522. As another example, FIG. 15C illustrates a system 1550 in which an illumination source 1552 is positioned to produce an illuminated area 1554 angled even further away from a display screen 1556 (e.g., as compared to the distance between the illuminated area 1514 and the display screen 1516). An intersection region 1558 located near the bottom of the display screen 1556 is formed by the intersection of the illuminated area 1554 and a narrow-angle field-of-view 1560 of a camera 1562.

Figure 16:
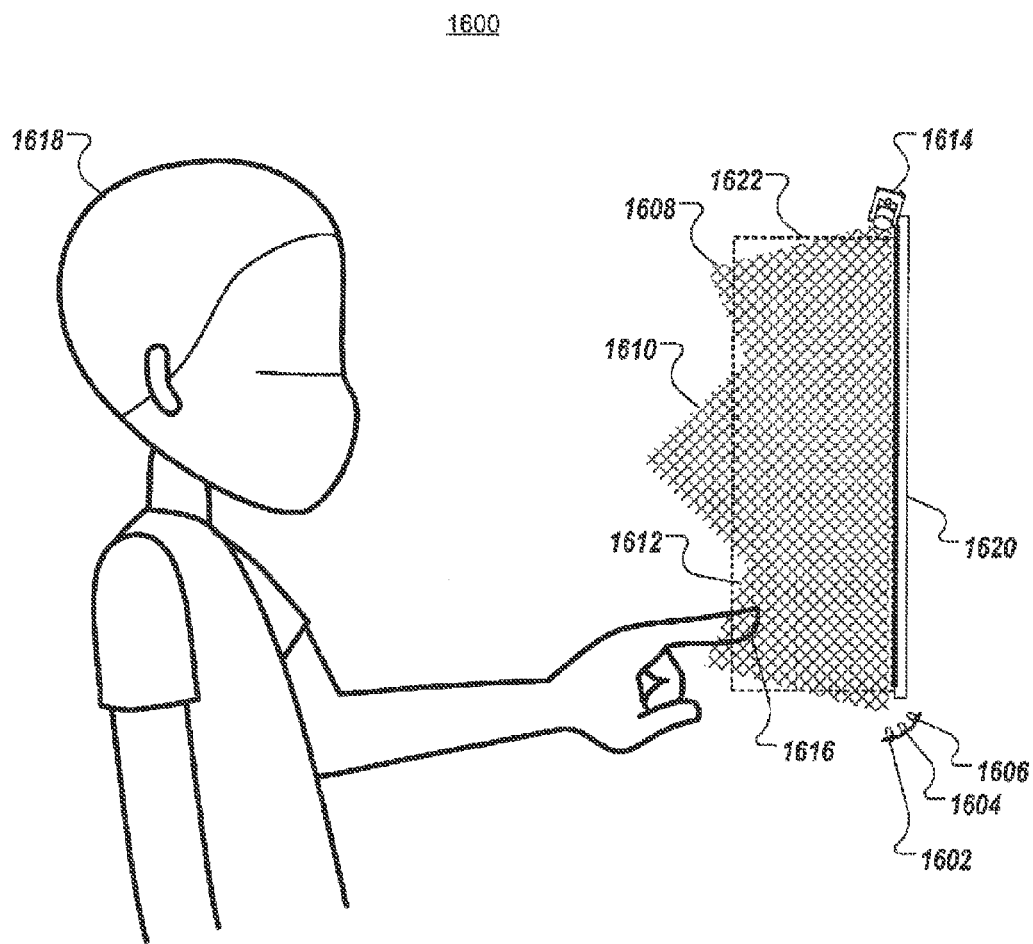

FIG. 16 illustrates a system 1600 which includes multiple illumination sources. The system 1600 includes illumination sources 1602-1606 producing illuminated areas 1608-1610, respectively. The illumination sources 1602-1606 may correspond, for example, to illumination sources 1512, 1532, and 1552, respectively, and the illuminated areas 1608-1612 may correspond to illuminated areas 1514, 1534, and 1554, respectively (e.g., as described above with respect to FIGS. 15A-C). The illumination sources 1602-1606 may be controlled to illuminate, one at a time, in sequence with images captured by a camera 1614. For example, the illumination source 1602 may be controlled to illuminate the illuminated area 1608 while the camera 1614 captures a first camera image, the illumination source 1604 may be controlled to illuminate the illuminated area 1610 while the camera 1614 captures a second camera image, and the illumination source 1606 may be controlled to illuminate the illuminated area 1612 while the camera captures a third camera image.

Returning to FIG. 14, for each of the multiple illumination sources, the system 300 identifies an image captured when the corresponding illumination source was illuminated and the other illumination sources were not (1404). For example and as shown in FIG. 16, a first camera image may be identified which corresponds to when the illumination source 1602 was illuminated, a second camera image may be identified which corresponds to when the illumination source 1604 was illuminated, and a third camera image may be identified which corresponds to when the illumination source 1606 was illuminated.

Returning to FIG. 14, the system 300 analyzes each of the identified images in combination to determine an enhanced position of an object within an intersection region defined by the multiple illumination sources (1406). For instance, in the example of FIG. 16, a finger 1616 of a user 1618 reaching towards the bottom of a display screen 1620 may be detected in a camera image captured when the illumination source 1606 is illuminated. If the user reaches farther forward, closer to the display screen 1620, the finger 1616 may be detected when either the illumination source 1604 or the illumination source 1602 is illuminated.

An approximately rectangular intersection region 1622 is formed by the combination of the intersection of the illuminated areas 1608-1612 and one or more field-of-views of the camera 1614. That is, the overlapping of the intersection of the illuminated area 1612 and a field-of-view of the camera 1614 with the intersection of the illuminated area 1610 and a field-of-view of the camera 1614 with the intersection of the illuminated area 1608 and a field-of-view of the camera 1614 nearly fills the rectangular area 1622. The use of illuminators 1602-1606 to form the rectangular intersection region 1622 allows for an object (e.g., the finger 1616) to be detected at close to a constant distance (e.g., six inches) from the display 1620. Additionally, the use of multiple illuminators 1602-1606 allows for a depth detection of the finger 1616 (e.g., distance from the display screen 1620), as well as for detection of a horizontal and vertical position of the finger 1616.

Figure 17:
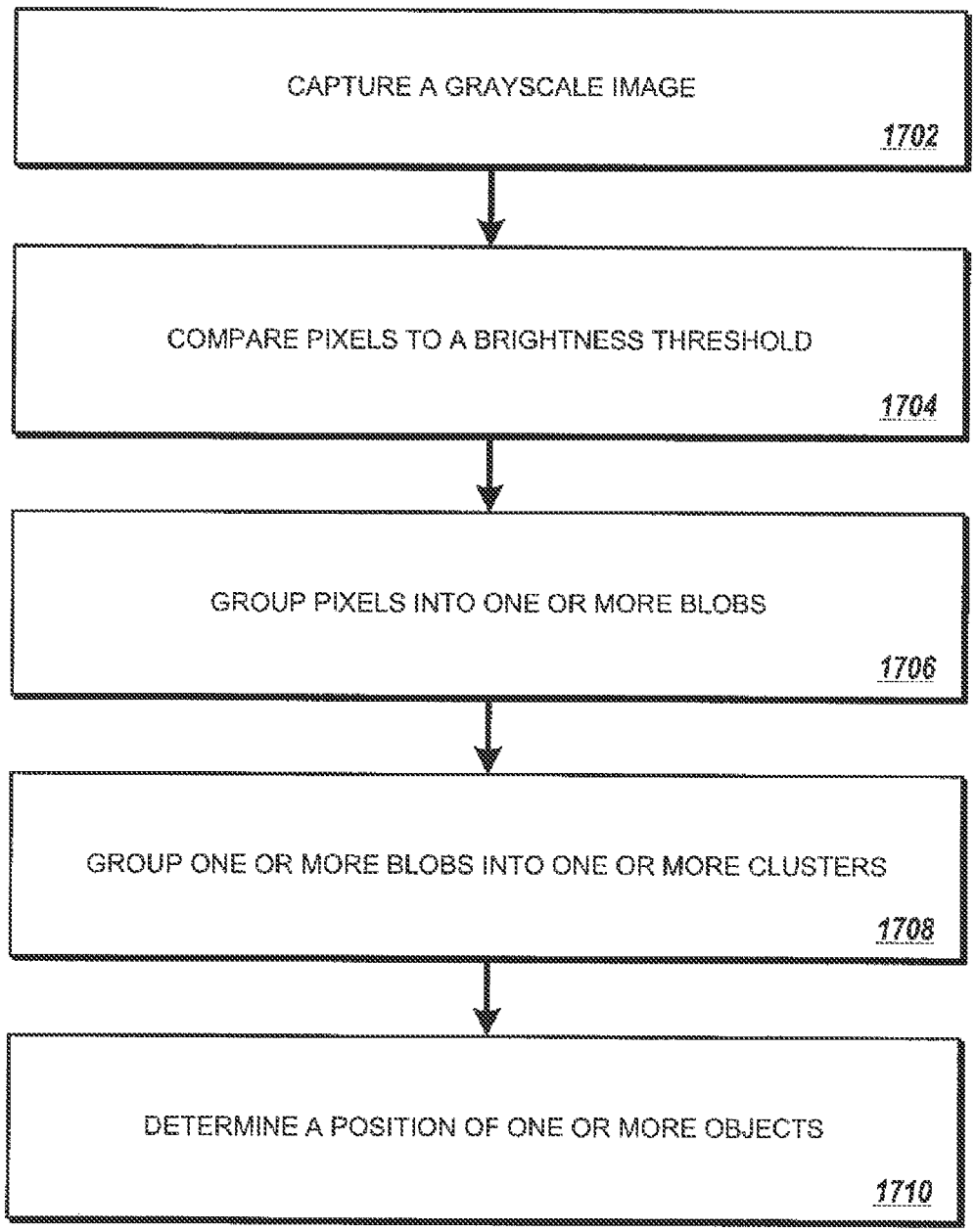

FIG. 17 illustrates a process 1700 for determining a position of one or more objects. The operations of the process 1700 are described generally as being performed by the system 300. The operations of the process 1700 may be performed exclusively by the system 300, may be performed exclusively by another system, or may be performed by a combination of the system 300 and another system. In some implementations, operations of the process 1700 may be performed by one or more processors included in one or more electronic devices.

The system 300 captures a grayscale image (1702). For example, the system 300 controls the illumination source 106 while the camera 104 is capturing grayscale images (e.g., with respect to FIG. 1).

The system 300 compares pixels of the grayscale image to a brightness threshold to produce a corresponding binary image (1704). For example, pixels in the camera image having a brightness value above a threshold may be identified in the binary image with a value of one and pixels having a brightness value below the threshold may be identified in the binary image with a value of zero.

The system 300 groups pixels within the binary image into one or more blobs (1706). For example, pixels may be clustered into one or more blobs based on proximity of the pixels together.

The system 300 references the grayscale image while clustering blobs within the binary images into one or more clusters (1708). Grayscale images may be referenced, for example, if two or more blobs are adjacent to one another in a binary image. Grayscale images might not be referenced if, for example, one blob exists in a binary image.

For example, if the user makes a "thumbs up" pose with their hand while the hand is in the intersection region, a binary clustering of pixels may result in two blobs (e.g., one blob for the thumb and one blob for the rest of the hand). Grayscale images may be referenced to determine whether the blob for the thumb and the blob for the hand should be connected, or whether they are in fact two distinct objects. For example, it may be determined that pixels located between the two blobs (e.g., where the thumb connects to the hand) had brightness values which were close to the brightness threshold, which indicates that the area between the blob for the thumb and the blob for the hand might be part of a single object (e.g., the hand along with the thumb) and that the area between the thumb and the hand was illuminated, but not highly illuminated by the illumination source. If it is determined that two nearby objects should be connected, the two objects may be connected and treated as a single cluster.

The system 300 determines a position of one or more objects in the captured images based on results of the clustering (1710). For example, for each cluster, a position may be computed. In this example, the position may be a centroid of a single blob in the cluster or a weighted combination of centroids from multiple blobs in the cluster. For blobs that were clustered based on referencing grayscale images, one position may be computed for the clustered blobs and used as the position of a corresponding detected object.

Figure 18:
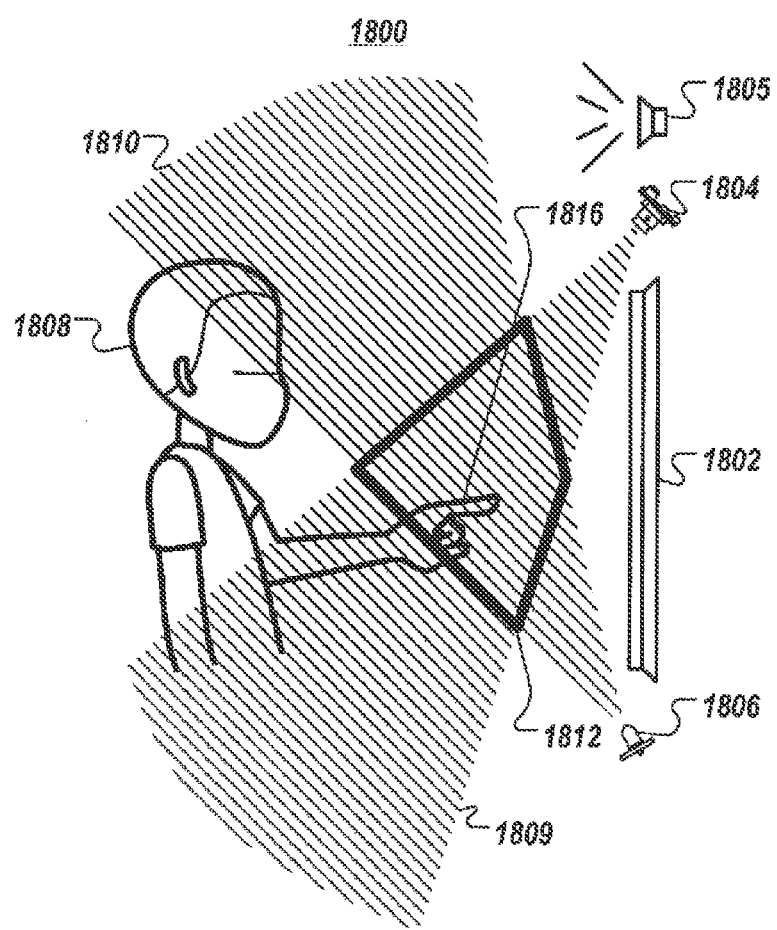

FIG. 18 illustrates an example of a tracking system 1800. The system 1800 may be used, for example, in a museum. The system 1800 may be targeted, for example, for use by blind patrons of the museum. The system 1800 includes a painting 1802, a camera 1804, a speaker 1805, and an illumination source 1806. The speaker 1805 may play a repeating sound, such as a "chirp" or "beep" to direct patrons to the vicinity of the painting 1802. For example, a blind patron 1808 may hear the beeping and may walk up to the painting 1802.

The camera 1804 is configured to capture images and is positioned at the top side of the painting 1802 and is angled downward with respect to the painting 1802. A field-of-view 1809 of the camera 1804 is located in front of the painting 1802. The illumination source 1806 is positioned at the bottom side of the painting 1802. The illumination source 1806 is configured to illuminate an illuminated area 1810 located in front of the painting 1802. The illuminated area 1810 intersects the field-of-view 1809 to define an intersection region 1812 in front of the painting 1802.

Captured camera images may be analyzed to detect an object such as a hand 1816 of the patron 1808 within the intersection region 1812. A user input may be determined based on the detection of the object within the intersection region 1812. For example, a "play audio recording" user input may be determined based on the presence of an object within the intersection region 1812. In response to the determined "play audio recording" user input, the speaker 1805 may be controlled to play an audio recording providing details about the painting 1802. As another example, a gesture may be detected based on one or more determined positions of the detected object. For example, a "swipe" gesture may be determined, a "stop audio playback" user input may be determined based on the recognized gesture, and the speaker 1805 may be controlled to turn off playback of the audio recording.

Figure 19:
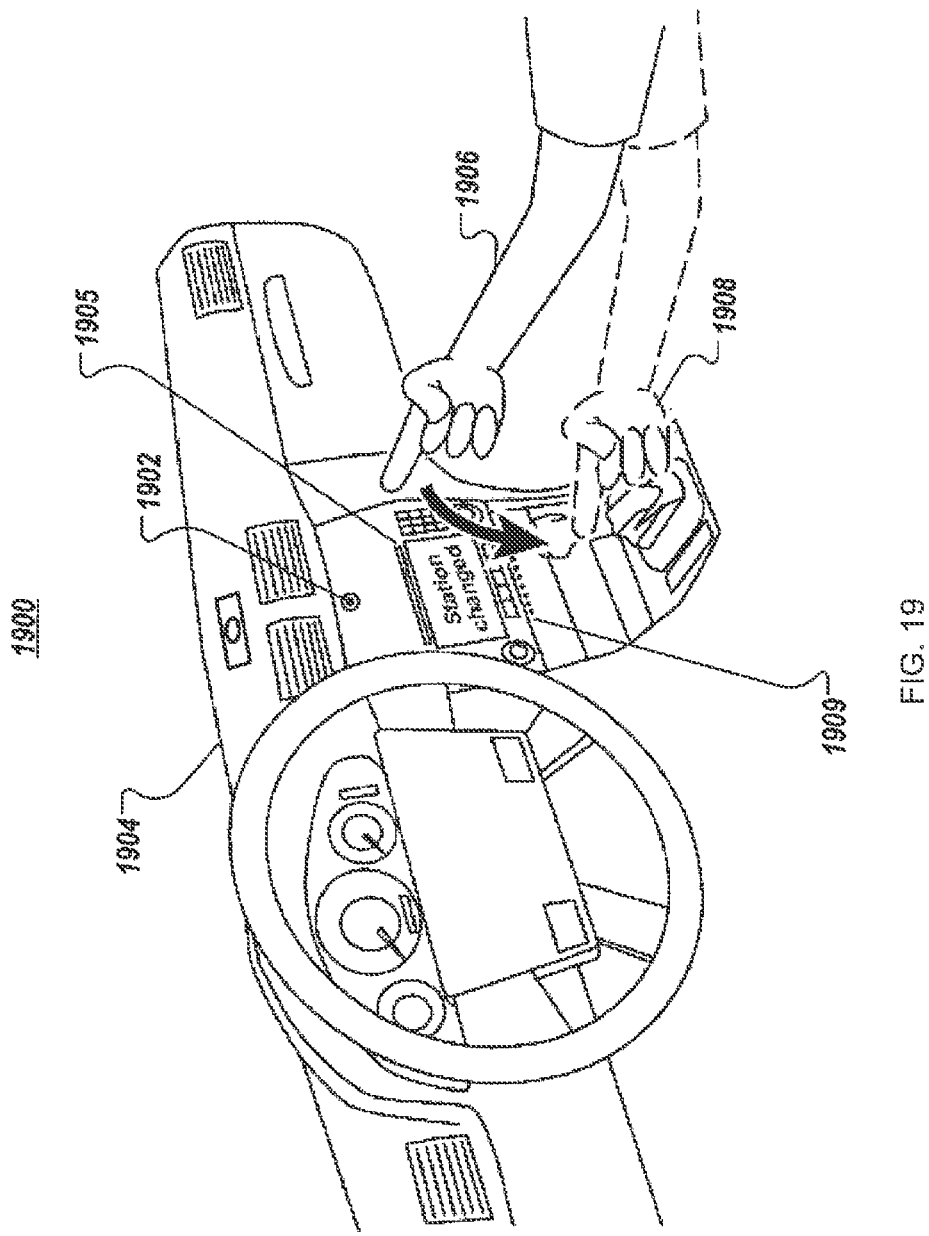

FIG. 19 illustrates a system 1900 for object tracking. A camera 1902 is included in (e.g., embedded in or mounted on) a car dashboard 1904. The field-of-view of the camera 1902 may be in front of the dashboard 1904 (e.g., extending from the camera 1902 towards the back of the vehicle). A radio 1905 may be positioned below the camera 1902. The field-of-view of the camera 1902 may be angled downward to capture images of an area in front of the radio 1905.

In some implementations, an illumination source 1909 may be positioned below the camera 1902. The illumination source 1909 may be a row of infrared LEDs. The row of infrared LEDs may be angled upward such that infrared light emitted by the row of infrared LEDs intersects the field-of-view of the camera 1902 to define an intersection region. The intersection region may be positioned about eight inches away from a front surface of the radio 1905 and may have a height that is similar to the height of the radio 1905. In the example shown in FIG. 19, the intersection region may be defined a sufficient distance above the gear shift such that a driver's movements to control the gear shift are not within the intersection region. In this configuration, the driver's movements to control the gear shift are not interpreted as control inputs to the radio 1905, even though the driver's movements to control the gear shift are within the field-of-view of the camera 1902.

A user's hand 1906 may be detected in one or more camera images captured by the camera 1902. The user may perform a right-to-left swipe gesture within the intersection region defined in front of the radio 1905, as illustrated by a hand 1908. The swipe gesture may be detected if multiple detected positions of the user's hand within a series of images indicate a fast side-to-side horizontal movement of the hand 1906. A "change station" user input may be determined based on the detected swipe gesture. The radio 1905 may be controlled to change to a different radio station (e.g., change to a next radio station in a list of predefined radio stations) based on the detected swipe gesture. Allowing a user to change a radio station of a car radio by swiping the user's hand in front of the car radio may increase the safety of using the car radio because the user may control the car radio without diverting his or her eyes from the road.

FIG. 20 is a schematic diagram of an example of a generic computer system 2000. The system 2000 can be used for the operations described in association with the processes 400, 500, 600, 900, 1400, and 1700, according to one implementation.

The system 2000 includes a processor 2010, a memory 2020, a storage device 2030, and an input/output device 2040. Each of the components 2010, 2020, 2030, and 2040 are interconnected using a system bus 2050. The processor 2010 is capable of processing instructions for execution within the system 2000. In one implementation, the processor 2010 is a single-threaded processor. In another implementation, the processor 2010 is a multi-threaded processor. The processor 2010 is capable of processing instructions stored in the memory 2020 or on the storage device 2030 to display graphical information for a user interface on the input/output device 2040.

The memory 2020 stores information within the system 2000. In one implementation, the memory 2020 is a computer-readable medium. In one implementation, the memory 2020 is a volatile memory unit. In another implementation, the memory 2020 is a non-volatile memory unit.

The storage device 2030 is capable of providing mass storage for the system 2000. In one implementation, the storage device 2030 is a computer-readable medium. In various different implementations, the storage device 2030 may be a floppy disk device, a hard disk device, an optical disk device, or a tape device.

The input/output device 2040 provides input/output operations for the system 2000. In one implementation, the input/output device 2040 includes a keyboard and/or pointing device. In another implementation, the input/output device 2040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. An electronic system comprising:
   an image sensor having a field of view of a first area;
   an illumination source that is configured to illuminate a second area, the second area intersecting the first area to define (a) an intersection region illuminated by the illumination source and within the field of view of the image sensor and (b) a non-intersection region not illuminated by the illumination source and within the field of view of the image sensor; and
   a processing unit configured to perform operations comprising:
   receiving an image from the image sensor;
   analyzing the image to detect an object within the intersection region and exclude objects within the non-intersection region; and
   determining user input based on the object detected within the intersection region, wherein the user input is determined based on a mapped position of the detected object.

2. The electronic system of claim 1, wherein the image sensor is located on a first side of a surface of a display screen, and wherein the field of view of the first area is in front of the display screen.

3. The electronic system of claim 2, wherein the illumination source is configured to illuminate the second area in front of the display screen intersecting the first area in front of the display screen to define the intersection region.

4. The electronic system of claim 2, wherein the illumination source and the image sensor are positioned such that the intersection region is within six inches from the display screen.

5. The electronic system of claim 2, wherein the object is a finger and the user input comprises a depth of the finger in relation to the display screen.

6. The electronic system of claim 1, wherein the operation of determining the user input based on the object detected within the intersection region comprises:
mapping a position of the object detected within the intersection region to a cursor of a user interface.

7. The electronic system of claim 1, wherein the processing unit is further configured to perform operations comprising:
controlling an application based on the determined user input.

8. The electronic system of claim 7, wherein controlling the application based on the determined user input comprises moving a cursor from a first cursor position to a second cursor position based on the determined user input.

9. The electronic system of claim 1, wherein analyzing the image captured by the image sensor to detect the object within the intersection region comprises:
comparing pixels of the image to a brightness threshold to produce a binary image, wherein pixels in the binary image indicate whether or not the corresponding pixels in the image captured by the image sensor meet the brightness threshold; and
determining a position of the object in the binary image.

10. The electronic system of claim 1, further comprising multiple illumination sources configured to illuminate in sequence with images captured by one or more image sensors in an alternating pattern with the illumination.

11. A method for determining a user input, comprising:
receiving an image from an image sensor, the image sensor having a field of view of a first area; and
illuminating, via an illumination source, a second area intersecting the first area to define (a) an intersection region illuminated by the illumination source and within the field of view of the image sensor and (b) a non-intersection region not illuminated by the illumination source and within the field of view of the image sensor;
analyzing the image to detect an object within the intersection region and exclude objects within the non-intersection region; and
determining user input based on the object detected within the intersection region, wherein the user input is determined based on a mapped position of the detected object.

12. The method of claim 11, wherein the image sensor is located on a first side of a surface of a display screen, and wherein the field of view of the first area is in front of the display screen.

13. The method of claim 12, wherein the illuminating comprises illuminating the second area in front of the display screen intersecting the first area in front of the display screen to define the intersection region.

14. The method of claim 12, wherein the illumination source and the image sensor are positioned such that the intersection region is within six inches from the display screen.

15. The method of claim 12, wherein the object is a finger and the user input comprises a depth of the finger in relation to the display screen.

16. The method of claim 11, wherein the determining comprises mapping a position of the object detected within the intersection region to a cursor of a user interface.

17. The method of claim 11, further comprising controlling an application based on the determined user input.

18. The method of claim 17, wherein controlling the application based on the determined user input comprises moving a cursor from a first cursor position to a second cursor position based on the determined user input.

19. The method of claim 11, wherein analyzing the image captured by the image sensor to detect the object within the intersection region comprises:
comparing pixels of the image to a brightness threshold to produce a binary image, wherein pixels in the binary image indicate whether or not the corresponding pixels in the image captured by the image sensor meet the brightness threshold; and
determining a position of the object in the binary image.

20. The method of claim 11, further comprising illuminating, via multiple illumination sources, in sequence with images captured by one or more image sensors in an alternating pattern with the illumination.

21. An apparatus for determining a user input, comprising:
means for receiving an image from an image sensor, the image sensor having a field of view of a first area; and
means for illuminating a second area intersecting the first area to define (a) an intersection region illuminated by the illuminating means and within the field of view of the image sensor and (b) a non-intersection region not illuminated by the illuminating means and within the field of view of the image sensor;
means for analyzing the image to detect an object within the intersection region and exclude objects within the non-intersection region; and
means for determining user input based on the object detected within the intersection region, wherein the user input is determined based on a mapped position of the detected object.

22. The apparatus of claim 21, wherein the image sensor is located on a first side of a surface of a display screen, and wherein the field of view of the first area is in front of the display screen.

23. The apparatus of claim 22, wherein the means for illuminating comprises means for illuminating the second area in front of the display screen intersecting the first area in front of the display screen to define the intersection region.

24. The apparatus of claim 21, wherein the means for analyzing the image captured by the image sensor to detect the object within the intersection region comprises:
means for comparing pixels of the image to a brightness threshold to produce a binary image, wherein pixels in the binary image indicate whether or not the corresponding pixels in the image captured by the image sensor meet the brightness threshold; and
means for determining a position of the object in the binary image.

25. A non-transitory storage medium comprising processor-readable instructions configured to cause a processor to:
receive an image from an image sensor, the image sensor having a field of view of a first area; and
illuminate, via an illumination source, a second area intersecting the first area to define (a) an intersection region illuminated by the illumination source and within the field of view of the image sensor and (b) a non-intersection region not illuminated by the illumination source and within the field of view of the image sensor;
analyze the image to detect an object within the intersection region and exclude objects within the non-intersection region; and
determine user input based on the object detected within the intersection region, wherein the user input is determined based on a mapped position of the detected object.

26. The non-transitory storage medium of claim 25, wherein the image sensor is located on a first side of a surface of a display screen, and wherein the field of view of the first area is in front of the display screen.

27. The non-transitory storage medium of claim 26, wherein the illuminating comprises illuminating the second area in front of the display screen intersecting the first area in front of the display screen to define the intersection region.

28. The non-transitory storage medium of claim 26, wherein the object is a finger and the user input comprises a depth of the finger in relation to the display screen.

29. The non-transitory storage medium of claim 25, wherein the determining comprises mapping a position of the object detected within the intersection region to a cursor of a user interface.

30. The non-transitory storage medium of claim 25, wherein the analyzing the image captured by the image sensor to detect the object within the intersection region comprises:
   comparing pixels of the image to a brightness threshold to produce a binary image, wherein pixels in the binary image indicate whether or not the corresponding pixels in the image captured by the image sensor meet the brightness threshold; and
   determining a position of the object in the binary image.

* * * * *